US012416898B2

(12) United States Patent
Erler et al.

(10) Patent No.: US 12,416,898 B2
(45) Date of Patent: Sep. 16, 2025

(54) HOLOGRAPHIC OPERATING ELEMENT

(71) Applicant: Carl Zeiss Jena GmbH, Jena (DE)

(72) Inventors: Christoph Erler, Jena (DE); Petr Vojtisek, Jena (DE); Siemen Kuehl, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 18/696,982

(22) PCT Filed: Sep. 28, 2022

(86) PCT No.: PCT/EP2022/077040
§ 371 (c)(1),
(2) Date: Mar. 28, 2024

(87) PCT Pub. No.: WO2023/052465
PCT Pub. Date: Apr. 6, 2023

(65) Prior Publication Data
US 2024/0402647 A1    Dec. 5, 2024

(30) Foreign Application Priority Data

Sep. 29, 2021  (DE) .......................... 102021210915.2

(51) Int. Cl.
*H04N 5/33* (2023.01)
*F21V 8/00* (2006.01)
(Continued)

(52) U.S. Cl.
CPC ........... *G03H 1/0443* (2013.01); *G02B 6/005* (2013.01); *G02B 6/0076* (2013.01); *G06F 3/017* (2013.01); *H04N 5/33* (2013.01)

(58) Field of Classification Search
None
See application file for complete search history.

(56) References Cited

U.S. PATENT DOCUMENTS 7,054,045 B2 * 5/2006 McPheters ............... G03H 1/26
341/23
2016/0276514 A1 * 9/2016 Simavoryan ............ H10F 77/45
(Continued)

FOREIGN PATENT DOCUMENTS

DE       102019206379 A1     11/2020

OTHER PUBLICATIONS

Ferrara, "Holographic waveguide periscopes in augmented reality displays"(Year: 2020).*
(Continued)

*Primary Examiner* — Eileen M Adams
(74) *Attorney, Agent, or Firm* — Skaar Ulbrich Macari, P.A.

(57) ABSTRACT

A lightguide structure for illumination, detection and/or holographic representation includes at least one planar lightguide for guiding electromagnetic radiation of at least a first spectrum, at least one illumination arrangement located on the first side face of the lightguide, and at least one holographic outcoupling structure for coupling out electromagnetic radiation guided in the lightguide structure. The light radiated in by the illumination arrangement can have a large angular range, the holographic outcoupling structure having a small angular range. Also provided is a production method for such a lightguide structure and to an operating element comprising a lightguide structure.

17 Claims, 7 Drawing Sheets

(51) Int. Cl.
　　*G03H 1/04*　　　　(2006.01)
　　*G06F 3/01*　　　　(2006.01)

(56) References Cited

U.S. PATENT DOCUMENTS

| | | |
|---|---|---|
| 2020/0249754 A1* | 8/2020 | Morozov .............. G06F 3/0304 |
| 2020/0271928 A1 | 8/2020 | Schwartze et al. |
| 2020/0409305 A1 | 12/2020 | Erler |
| 2022/0229188 A1 | 7/2022 | Klug et al. |
| 2022/0299772 A1* | 9/2022 | Mills .................. G02B 27/0172 |
| 2022/0309759 A1 | 9/2022 | Klug et al. |

OTHER PUBLICATIONS

International Search Report rendered by the International Searching Authority for PCT/EP2022/077040, dated Jan. 24, 2023, 2 pages.
International Preliminary Report on Patentability rendered by the International Searching Authority for PCT/EP2022/077040, dated Apr. 11, 2024, 9 pages.

* cited by examiner

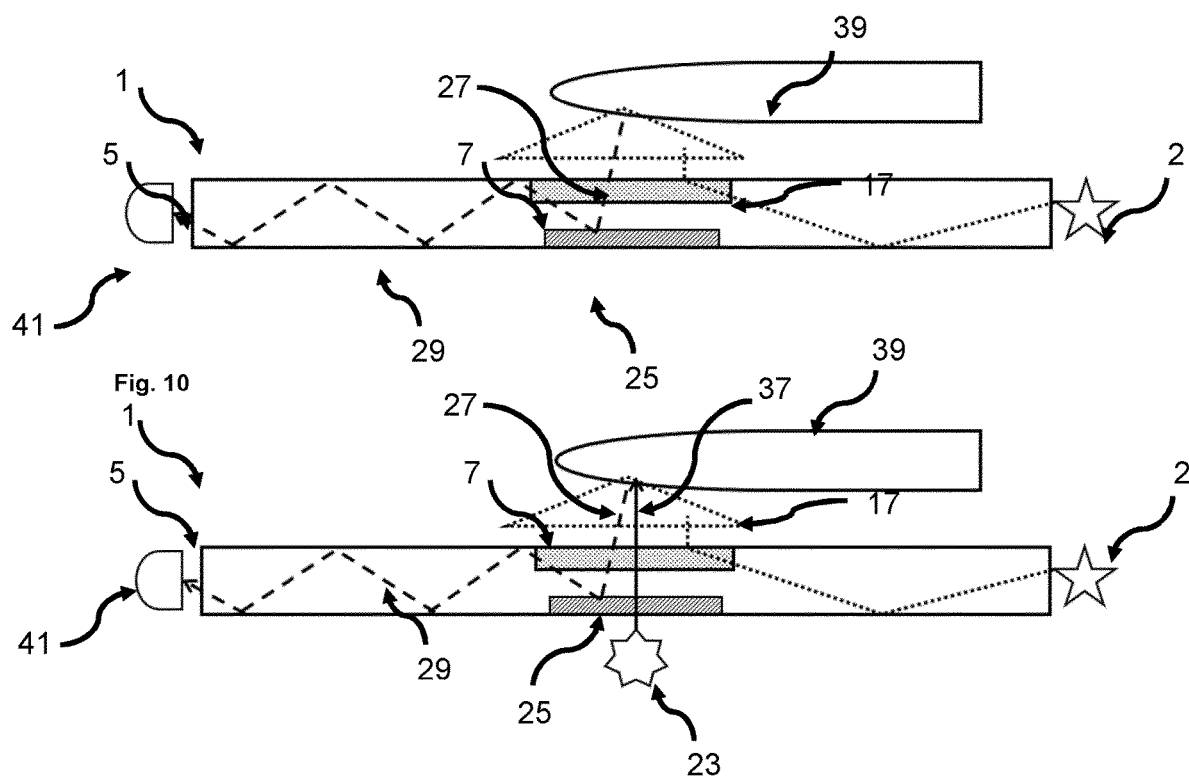

HOLOGRAPHIC OPERATING ELEMENT

PRIORITY

This application claims the priority of German patent application DE 10 2021 210 915.2, filed Sep. 29, 2021, which are hereby incorporated herein by reference in its entirety.

FIELD

In one aspect, the invention relates to a light guide structure for an illumination, a detection and/or a holographic representation, comprising at least one planar light guide for guiding electromagnetic radiation of at least one first spectrum, at least one illumination arrangement arranged at the first side surface of the light guide, at least one holographic outcoupling structure for outcoupling electromagnetic radiation guided in the light guide structure. In this case, the light radiated in by the illumination arrangement can have a large angular spectrum, the holographic outcoupling structure having a small angular spectrum.

The invention likewise relates to a production method for such a light guide structure and an operating element comprising a light guide structure.

BACKGROUND

Initial holographic illumination concepts are already known in the prior art, for example from DE 10 2016 117 969 A1.

However, holographic elements can surprisingly also be used in hitherto unknown fields of use within a vehicle and thus increase safety and operability.

One disadvantage of the holographic illumination concepts known hitherto resides in the complex illumination of the holographic structures that is required in order to ensure a sufficient quality of the desired holographic illumination function. Hitherto this has primarily necessitated sufficiently coordinating the frequency spectrum and angular spectrum of the light source with the hologram to be illuminated, which has often necessitated the use of high-quality and expensive light sources and complex beam shaping components. Production is therefore often expensive. The coupling efficiency of light source and hologram is likewise dependent on the variables mentioned above. Therefore, holographic solutions were often too expensive to be mass-produced.

On the other hand, traditional illuminated displays and operating elements which manage without holographic elements often encounter their limits as far as operability and safety are concerned. New functionalities can no longer be developed by the traditional concepts.

SUMMARY

It is an object of the invention to provide a device without the disadvantages of the prior art. Provided herein is a simple and inexpensive holographic light guide and a cost-effective production method. Also provided is a particularly user-friendly and safe holographic operating element which at the same time is robust and cost-effective and suitable for mass production.

In an example embodiment, a light guide structure for an illumination comprises, a detection and/or a holographic representation, comprising at least one planar light guide configured for guiding electromagnetic radiation of at least one first spectrum, at least one illumination arrangement arranged at the first side surface of the light guide and comprising at least one light source for emitting electromagnetic radiation with a first spectrum in order to radiate electromagnetic radiation with the first spectrum into the light guide, at least one holographic outcoupling structure preferably spaced apart from the first side surface and configured for outcoupling electromagnetic radiation, preferably of the first spectrum, of the illumination arrangement guided in the light guide structure from a first main surface of the light guide structure within an acceptance angle spectrum of the outcoupling structure, wherein the illumination arrangement comprises no beam shaping component and wherein preferably the acceptance angle spectrum of the holographic element has an absolute value of at most 10°, particularly preferably at most 5°.

Such a light guide is particularly simple and inexpensive to produce.

In this case, the at least one holographic outcoupling structure is preferably configured for a holographic representation by generating a real and/or virtual image within and/or outside the light guide structure and in particular within the first main surface of the light guide structure. The generation of an image within the first main surface is preferably also referred to as "in-plane" representation.

In particular owing to the use of an acceptance angle spectrum delimited as described and/or an "in-plane" representation, the requirements in respect of the beam homogeneity (e.g. collimation, angular spectrum) of the electromagnetic radiation that is radiated in are low and an image representation complying with the requirements in respect of quality and/or brightness can be realized despite a simple set-up. In the case of an acceptance angle spectrum of at most 10° in combination with an in-plane hologram, a good compromise between quality and brightness can be found since the demands made of the illumination are low in the case of an in-plane hologram on account of the absent "depth" of the representation. In the case of an acceptance angle spectrum of at most 5°, the quality of the representation can advantageously be improved. A sufficient number of light sources and/or a sufficiently intense light source can be used for a possible adaptation of the brightness.

In particular in combination with an "in-plane" representation it can also be preferred for the acceptance angle spectrum of the outcoupling structure to be at least 1°, more highly preferably at least 2°, even more highly preferably at least 3°, especially preferably at least 4° and in particular at least 5°. Since the requirements in respect of the illumination quality for an acceptable representation are particularly low in the case of the "in-plane" representation, the acceptance angle spectrum can advantageously be as large as possible in order to realize a simple set-up of the light guide structure without beam shaping components which combines a good representation quality with a high efficiency and/or brightness.

In a further preferred embodiment, more than one holographic outcoupling structure is comprised, in particular up to five holographic outcoupling structures are comprised, wherein each holographic outcoupling structure has a different reconstruction angle within the angular spectrum of the electromagnetic radiation radiated in by the illumination arrangement and/or emitted by the light source in the direction of the light guide.

In this case, the individual holographic outcoupling structures and the combination thereof can preferably have each of the properties described in this document, e.g. in regard to the acceptance angle spectrum.

In this case, each holographic outcoupling structure is preferably configured for a mutually corresponding holographic representation by generating a mutually corresponding real and/or virtual image within and/or outside the light guide structure and in particular within the first main surface of the light guide structure.

In this way, the efficiency of the light guide structure can advantageously be increased with the representation quality remaining the same.

In a second example embodiment, a light guide structure for an illumination comprises, a detection and/or a holographic representation, comprising at least one planar light guide configured for guiding electromagnetic radiation of at least one first spectrum, at least one illumination arrangement arranged at the first side surface of the light guide and comprising at least one light source for emitting electromagnetic radiation with a first spectrum in order to radiate electromagnetic radiation with the first spectrum into the light guide, at least one holographic outcoupling structure preferably spaced apart from the first side surface and configured for outcoupling electromagnetic radiation, preferably of the first spectrum, of the illumination arrangement guided in the light guide structure from a first main surface of the light guide structure within an acceptance angle spectrum of the outcoupling structure, wherein preferably the angular spectrum of the electromagnetic radiation radiated in by the illumination arrangement and/or emitted by the light source in the direction of the light guide has an absolute value of at least 15°, preferably at least 20°, more highly preferably at least 30° and in particular at least 40°, and wherein the angular spectrum of the radiated-in electromagnetic radiation guided in the light guide from the illumination arrangement to the holographic outcoupling structure and/or the acceptance angle spectrum of the holographic element have/has an absolute value of at most 5°.

It is evident to a person skilled in the art that advantages, definitions, and embodiments of the device according to the first aspect likewise apply to the second aspect, and vice versa.

A light guide structure for an illumination, a detection and/or holographic representation preferably comprises at least one element which is transparent to the light to be guided, e.g. at least one planar light guide which guides the light in its interior over a certain distance. This can mean, for example, that the light, with and/or without internal reflections (e.g. total internal reflection on account of a reflection of the light at an angle greater than the critical angle of total internal reflection) at the interfaces of the light guide, covers a certain distance within the element, e.g. from the incoupling of the light as far as a location of the desired outcoupling.

At least one light guide is comprised by the light guide structure, that is to say that, accordingly, besides a single light guide, 2 light guides, 3 light guides, 4 light guides, 5 light guides, 6 light guides, 7 light guides, 8 light guides, 9 light guides, 10 light guides or more than 10 light guides can also be comprised. Preferably, a plurality of light guides within the light guide structure are arranged parallel to one another and have main surfaces arranged parallel to one another, in particular.

A planar light guide is preferably such an above-described element which is planar. In this context, planar means, in particular, forming a relatively wide surface, flattened, and/or extending on a surface. For example, planar can mean that the light guide has a large extent along a plane or surface and a comparatively significantly smaller extent in a direction perpendicular thereto. In this case, the plane or surface can also be a curved plane or surface. A significantly smaller extent preferably means an extent smaller than the smallest extent along the surface or plane by at least a factor of two. Preferably, the planar light guide has a large extent along two parallel main surfaces and a significantly smaller extent along the side surfaces. The side surfaces preferably extend along the thickness of the planar light guide. In this case, for example, there can be side surfaces having larger surface areas and side surfaces having smaller surface areas, preferably in the case of a parallelepipedal light guide.

The planar light guide is configured for guiding electromagnetic radiation of at least one first spectrum. That is to say preferably that the planar light guide is substantially transparent to the electromagnetic radiation of the first spectrum.

Transparent preferably means that the light guide is transmissive to the electromagnetic radiation of the first spectrum. In particular, transparent means that the main body has a transmittance related to the intensity of the electromagnetic radiation of at least 40%, at least 45%, at least 50%, at least 55%, at least 60%, at least 65%, at least 70%, at least 75%, at least 80%, at least 85%, at least 90%, and/or at least 95%.

Terms such as substantially, approximately, about, circa, etc., preferably describe a tolerance range of less than ±20%, preferably less than ±10%, even more preferably less than ±5%, and in particular less than ±1%. Information of substantially, approximately, about, circa etc. discloses and also always includes the exact stated value.

The electromagnetic radiation of the first spectrum preferably comprises visible light and in particular light in a wavelength range of between 420 nanometers (nm) and 750 nm. Preferably, the electromagnetic radiation of the first spectrum is also referred to as light in this document. The electromagnetic radiation of the second spectrum can comprise the entire visible wavelength range, but it can also comprise arbitrarily narrow spectral sub-ranges thereof.

The holographic outcoupling structure, in particular, can be directed to a relatively narrow spectral sub-range of visible light, such that this structure substantially only diffracts and/or outcouples this sub-range.

The light guide preferably comprises a transparent substrate. The light guiding body can, for example, comprise a transparent glass or PMMA substrate.

The fact that the light guide is configured for guiding electromagnetic radiation of at least one first spectrum preferably means, moreover, that it enables the guiding by virtue of a corresponding geometric shaping. That can mean, for example, that it has correspondingly arranged outer interfaces which enable light guiding in the event of a desired incoupling by way of total internal reflection of at least one portion of the incoupled light.

The at least one illumination arrangement arranged at the first side surface of the light guide and comprising at least one light source for emitting electromagnetic radiation with a first spectrum in order to radiate electromagnetic radiation with the first spectrum into the light guide can comprise, according to the wording, one illumination arrangement or a plurality of, i.e. at least two, illumination arrangements. 3, 4, 5, 6, 7, 8, 9, 10, 11, 12, 13, 14, 15, 16, 17, 18, 19, 20, . . . , 25, . . . 30, . . . 40, . . . , 50 or more illumination arrangements can be comprised, where the numbers not listed between the listed numbers are preferably deemed likewise to be encompassed.

Each illumination arrangement can likewise comprise one light source or a plurality of, i.e. at least two, light sources. 3, 4, 5, 6, 7, 8, 9, 10, 11, 12, 13, 14, 15, 16, 17, 18, 19, 20, . . . , 25, . . . 30, . . . 40, . . . , 50 or more light sources can be comprised, where the numbers not listed between the listed numbers are preferably deemed likewise to be encompassed.

In the minimum configuration, the illumination arrangement comprises at least one light source, and no further elements otherwise. However, it can likewise be preferred for an illumination arrangement to comprise further elements or components besides the at least one light source.

The first side surface is preferably one side surface of the light guide. It can be preferred for the light guide to comprise exactly one side surface. It can likewise be preferred for the light guide to comprise more than one side surface, i.e. at least two side surfaces, three side surfaces, four side surfaces or even more side surfaces. In this case, preferably each side surface is defined by bounding edges at which the side surface touches other surfaces of the light guide. In the case of a parallelepipedal light guide, the first side surface is preferably one of the two side surfaces having small surface areas, but one of the two side surfaces having large surface areas can also be involved. Preferably, a side surface of the light guide is a surface of the light guide which is not a main surface of the light guide.

An illumination arrangement for radiating electromagnetic radiation with the first spectrum into the light guide preferably radiates at least one portion of the emitted radiation of the first spectrum into the light guide. It is accordingly preferably aligned and arranged correspondingly with respect to the light guide and has a suitable emission characteristic. A person skilled in the art knows how they can satisfy these requirements using standard components, for example.

A holographic outcoupling structure comprises a hologram, in particular. In contrast to normal imaging, for example in photography, phase relationships of the light coming from the object are also stored in holography, in addition to the intensity of the imaged object. These phase relationships contain additional spatial information, whereby a three-dimensional impression of the image can be generated. This is effected with the aid of interference of light beams while the object is being recorded. The object is illuminated using coherent light, which is reflected and scattered by the object. The resulting wave field, which is known as object wave, is superimposed with light coherent with the object wave (what is known as the reference wave, typically from the same light source, for example a laser), and the wave fields interfere with one another as a function of their phase relationship. The resulting interference pattern is recorded using a light-sensitive layer, for example, and consequently the information contained in the phase is also stored. For reconstruction purposes, the resultant hologram is illuminated using a light wave which is identical or similar to the reference wave, and this light wave is subsequently diffracted by the recorded interference patterns. The original wavefront of the object wave can be reconstructed in this way.

The similarity between the light beams used for reconstruction and the light beams of the reference wave used for recording and/or the properties of the light beams used for recording the hologram are advantageously crucial variables for the quality of the holographic illumination function generated by the hologram, e.g. the accuracy during deflection and/or beam shaping of the hologram and/or the sharpness and/or spatial depth during the generation of an image by the hologram. The similarity or the properties of the light beams can be described, in particular, in relation to the frequency spectrum, the angular spectrum and/or coherence properties of the light beams. The angular spectrum preferably describes the angular proportions of the illuminating light beams or beams of rays in relation to a reference straight line and/or reference plane. The angular spectrum is characterized e.g. by the shape of the wavefront of the propagating light along the beam path. For example, a plane wave would cause the outcoupling structure to be illuminated from one angle only, or would cause the light to propagate along the beam path without divergence, and so the angular spectrum would advantageously be equal to zero.

In the case of a small angular spectrum, in particular, it is advantageously possible to achieve a good quality of the holographic illumination function, in particular of the holographically generated image, of the beam shaping performed by the hologram, and/or of the holographically generated light deflection.

There are various types of holograms, e.g. so-called volume holograms. Volume holograms preferably have a thickness which can likewise be used for storing holographic image information.

Holograms can be for example transmission and reflection holograms, which generate this reconstruction in each case either in transmission or in reflection. In the case of a transmission hologram, for example, if an observer is situated on an opposite side of the hologram from the light source and views the hologram, the imaged object for example appears in front of the observer in three-dimensional fashion. In the case of a reflection hologram, for this purpose the observer must preferably be situated on the same side as the light source. Reflection holograms preferably have a wavelength-selective efficiency in order to efficiently diffract the light in a specific direction (along a specific angle).

Besides the three-dimensional representation, holograms can be used in the form of so-called holographic optical elements (HOEs), the holographic properties of which can be used for the optical system of apparatuses. By way of example, conventional lenses, mirrors and prisms can be replaced by HOEs. In other cases, HOEs are used as special diffraction gratings. HOEs have for example a spectral selectivity and/or a selectivity in relation to the angle of incidence. At the same time, they can be completely or partly transparent to other spectral ranges and/or angles of incidence.

Holograms, in particular technical holograms, by means of a variety of holographic methods, can be directly recorded or printed from computer-generated data with the aid of wavefront printers or stereo-holography printers. However, owing to the high expenditure of time, these production methods are not suitable for mass production of optical functions in the form of holograms. Suitable replication methods are appropriate for this.

A holographic outcoupling structure can preferably be used as such a HOE which correspondingly deflects the electromagnetic radiation from the illumination arrangement, which is incident on it and which passes to it through the light guide, in particular of the first spectrum or for parts of the first spectrum, such that this radiation is outcoupled from a first main surface of the light guide structure. In this case, the outcoupling structure can preferably impart a direction to the light which is incident on it and which passes to it from the illumination arrangement through the light guide, and/or perform beam shaping of the beam or beam of rays of the light. At the same time, the holographic outcoupling structure can preferably also perform a hologram function by generating a virtual and/or real image in the event of a corresponding illumination of the illumination arrangement through the light guide, said image having a three-dimensional appearance, in particular. All this or parts of the above are preferably meant by the feature that the holographic outcoupling structure is configured for outcoupling electromagnetic radiation of the illumination arrangement guided in the light guide structure from a first main surface of the light guide structure. This is preferably also referred to as a holographic illumination function of the holographic outcoupling structure. This holds true here in particular for electromagnetic radiation of the first spectrum or at least for spectral sub-ranges of the first spectrum. It is preferred for the outcoupling structure to have the desired properties only selectively for these sub-ranges, for example for a spectral range of 5 nm or less, 10 nm or less, or a wider spectral range.

Preferably, the holographic outcoupling structure is arranged in the light guide. By way of example, the holographic outcoupling structure can be written and/or introduced into the light guide by corresponding techniques known to a person skilled in the art.

It can likewise be preferred for the outcoupling structure to be comprised by at least one layer applied to the transparent substrate, more highly preferably on a main surface, in particular on a first main surface. This layer is then preferably comprised as it were by the light guide and in particular likewise transparent. The at least one layer preferably comprises one or more of the following layers: hologram layer, which preferably comprises the holographic structure, layer comprising triacetate, transparent adhesive layer or adhesive film (e.g. OCA) and/or layer/film comprising polycarbonate (PC). The layer can comprise in particular a film, e.g. a hologram film, a triacetate film, an adhesive film and/or a polycarbonate film. In this case, the layer and the outcoupling structure comprised by the layer are preferably planar and comprise a main surface of the light guide or are parallel to this main surface. This can for example also be referred to as arrangement of the outcoupling structure at the light guide.

Preferably, the outcoupling structure is planar.

Preferably, the holographic outcoupling structure is arranged parallel to the main surface, in particular parallel to the first main surface. The parallelism relates in particular to structural elements of the outcoupling structure, e.g. the arrangement of modulations of the refractive index within the outcoupling structure and/or the planar extent of the outcoupling structure.

The first main surface of the light guide structure is preferably a main surface of a light guide. Each comprised light guide preferably has at least one first main surface, preferably a plurality of main surfaces, i.e. also at least one second main surface. In the case of a plurality of light guides, preferably arranged parallel to one another, the main surface comprises in particular an outer surface of the light guide structure which in turn comprises an exterior, in particular first, main surface of a light guide of the light guide structure. An exterior main surface of one of a plurality of light guides of the light guide structure is in particular a main surface of a light guide structure which is not oriented toward a further light guide. If the light guide structure comprises for example two light guides which are arranged parallel and which are substantially parallelepipedal and each have two main surfaces, two main surfaces of the light guides, respectively one of one light guide and the other of the other light guide, are arranged toward one another or directly next to one another and preferably on the interior in relation to the entire light guide structure. This preferably involves the second main surface of the respective light guides. In this case, the other two main surfaces of the two light guides, in relation to the entire light guide structure, are preferably on the exterior and oriented away from one another. These main surfaces are preferably referred to as main surfaces of the light guide structure. This preferably involves in each case the first main surface of the light guide. If only a single light guide is comprised by the light guide structure, for example, preferably each of the main surfaces of the light guide, i.e. in particular the first and second main surfaces thereof, forms a main surface of the light guide structure. In this case, the light guide structure can preferably have a plurality of main surfaces, in particular two main surfaces, each of which is formed in particular by a respective main surface of the at least one light guide comprised. One of these main surfaces is preferably the first main surface, and the other the second main surface of the light guide structure.

A holographic outcoupling structure spaced apart from the first side surface is at a distance from the first side surface, at which the illumination arrangement is present. This distance can be in the centimeter range, for example. Consequently, the light guide is preferably functionally structured into a region at the first side surface, at which the illumination is performed, and a region spaced apart from this side surface, at which the outcoupling from the first main surface takes place by way of the holographic outcoupling structure.

However, it can also be preferred for the holographic outcoupling surface to be present at or adjoin the first side surface directly.

Preferably, the outcoupling structure has an acceptance angle spectrum. This preferably means that the outcoupling structure fulfils the desired properties, e.g. described above, in particular that the outcoupling structure as described herein is configured for outcoupling electromagnetic radiation of the illumination arrangement guided in the light guide structure from a first main surface of the light guide structure, only if the light which passes through the light guide from the illumination arrangement to said outcoupling structure lies within a specific angular range in relation to the outcoupling structure, in relation to a surface comprised by the outcoupling structure and/or in relation to the first main surface of the light guide structure. Consequently, it can advantageously hold true that the acceptance angle spectrum comprises the angles which generate a good holographic function/a good image. This angle or angular range is preferably measured on the basis of a light beam in relation to a straight line or a plane, as described in this document. The surface comprised by the outcoupling structure can concern in particular a surface within which structural elements of the outcoupling structure are present after having been arranged, e.g. the arrangement of modulations of the refractive index within the outcoupling structure. The surface along the planar extent of the outcoupling structure can likewise be meant.

This angular range is preferably called an acceptance angle spectrum and comprises in particular the angular range for which the outcoupling hologram has the desired properties described here for the first spectrum and/or parts of the first spectrum. In particular, the acceptance angle spectrum is defined in relation to the efficiency of the holographic outcoupling structure, in particular in relation to the outcoupling efficiency, which is considered depending on the angular range described above. In this case, the efficiency can preferably assume values of between 0 (e.g. no light is outcoupled) and 1 (all light is outcoupled). In this case, the acceptance angle spectrum is preferably defined by the fact that the outcoupling efficiency is 0.1 or greater, more highly preferably at least 0.5, for the angular range comprised.

The acceptance angle spectrum is measured in particular in relation to the surface normal of the outcoupling structure, the surface normal of the surface comprised by the outcoupling structure, and/or the surface normal with respect to the first main surface of the light guide structure.

The acceptance angle spectrum can likewise be measured in relation to the reconstruction angle or be defined around the latter. The reconstruction angle is preferably the angle at which the holographic outcoupling structure was recorded and/or at which the outcoupling efficiency is at a maximum. The acceptance angle spectrum is preferably determined by the distribution of the outcoupling efficiency around the reconstruction angle. The reconstruction angle can preferably be measured in relation to the surface normal of the outcoupling structure, the surface normal of the surface comprised by the outcoupling structure, and/or the surface normal with respect to the first main surface of the light guide structure.

The angular spectrum incident on the outcoupling structure can preferably be ascertained by determining the root mean square of the difference of all angles from the target reconstruction angle (preferably so-called RMS radius). This can then be compared with the acceptance angle spectrum.

In principle, that can be taken to mean preferably the (acceptance) angle spectrum in a vertical direction, i.e. preferably the (acceptance) angle spectrum or the projection thereof in relation to a cross-sectional plane of the light guide, and/or the (acceptance) angle spectrum in a horizontal direction, i.e. preferably the angular spectrum or the projection thereof in relation to a longitudinal sectional plane of the light guide or perpendicularly to the incoupling surface (to the first side surface). As the case may be, preferably the angle is measured in relation to the respective plane.

Preferably, the (acceptance) angle spectrum in this document is taken to mean the (acceptance) angle spectrum in a horizontal direction.

It can also be preferred quite generally to measure the acceptance angle spectrum in relation to the aforementioned surface normal, without referring to one of the stated directions in the process.

The cross-sectional plane is defined for example as a plane parallel to the first side surface. Preferably incoupled light beams radiate through the cross-sectional plane and the latter is e.g. perpendicular to a chief ray direction of the light beams of the illumination arrangement that are incoupled into the light guide.

A chief ray direction is preferably a direction in which there is a maximum intensity of the light beam or beam of rays, or an intensity of the light beam or beam of rays averaged over all directions. The terms chief ray and chief ray direction preferably denote here the central ray of a beam of rays and its direction, respectively. In this case, the direction of the chief ray indicates the direction of the beam of rays, in particular. In the case of a collimated beam of rays, the remaining rays of the beam of rays travel substantially parallel to the chief ray direction, and so the chief ray direction is preferably representative of the rays of a beam of rays. In the case of a non-collimated beam of rays, the rays of the beam of rays enclose a defined solid angle, at the center of which the chief ray direction runs.

The longitudinal sectional plane is defined for example as a plane which is perpendicular to the first side surface in which the surface normal of the outcoupling structure, of the surface comprised by the outcoupling structure, and/or of the first main surface of the light guide structure. The longitudinal sectional plane can preferably be a surface perpendicular to the cross-sectional plane. The longitudinal sectional plane is preferably present along or parallel to a chief ray direction of the light beams of the illumination arrangement that are incoupled into the light guide.

In this case, preferably the angular spectrum of the electromagnetic radiation radiated in by the illumination arrangement and/or emitted by the light source in the direction of the light guide has an absolute value of at least 15°, preferably at least 20°, more highly preferably at least 30° and in particular at least 40°. This angular spectrum is preferably taken to mean the angular distribution of the electromagnetic radiation radiated in and/or emitted by the light source in the direction of the light guide in relation to a surface normal, in relation to the centroid angle of the electromagnetic radiation radiated in and/or emitted by the light source in the direction of the light guide, and/or in relation to the reconstruction angle of the outcoupling structure.

The centroid angle is preferably the angle, measured in relation to a surface normal, at which the radiated-in and/or emitted light intensity is the highest.

The angular spectrum radiated in preferably denotes the angular spectrum which is radiated into the light guide from the illumination arrangement and which is preferably measured in the same way (with the same reference straight line and/or plane) as described above for the acceptance angle spectrum of the outcoupling structure, where preferably it is possible likewise to draw a distinction between angular spectrum in a vertical direction and angular spectrum in a horizontal direction, or else not to draw such a distinction. The angular spectrum radiated in can preferably likewise be measured in relation to a chief ray direction of the light radiated in. It can also be preferred for the angular spectrum radiated in to be measured analogously to the acceptance angle spectrum of the outcoupling structure, wherein preferably the reference straight line, the normal or plane on the basis of which the angular spectrum is measured is displaced parallel such that measurement is carried out e.g. at the incidence location (at the first side surface) or in the region of the incidence location. The angular spectrum radiated in is preferably the angular range in which an intensity radiated in is measurable and/or would have to be present on the basis of calculations. The angular spectrum radiated in can be determined for example in relation to a number between 0 and 1, which is called the relative intensity radiated in. In this case, this number determines whether a relative intensity radiated in is present within a specific angle or angular range measured as described above. By way of example, this relative intensity radiated in can be normalized in relation to the intensity maximally radiated in at a specific angle or angular range within the angular spectrum. The relative intensity radiated in then assumes the value 1 at the at least one angle within the angular range at which the intensity radiated in is at a maximum, and the value 0 is assumed if no measurable intensity at all is radiated in. In this case, the angular spectrum radiated in is preferably defined by the relative intensity radiated in being 0.1 or greater for the angular range comprised. Alternatively, the angular spectrum radiated in can be defined by the fact that there an intensity radiated in, taking account of possible measurement and/or calculation uncertainties (e.g. noise), is greater than 0, preferably greater than 0.1 lm.

The angular spectrum of the electromagnetic radiation emitted by the light source in the direction of the light guide preferably denotes the angular spectrum of the electromagnetic radiation emitted by the light source in the direction of the light guide before being radiated into the light guide and/or before possible beam shaping. "In the direction of the light guide" preferably denotes the emitted light beams pointing in the direction of a half-space within the light guide that is defined by the first side surface. This preferably denotes the angular spectrum which is emitted by the light source and which can be radiated into the light guide potentially, depending on the constitution of the illumination arrangement, of the elements present between light source and light guide, and/or of the light guide, because this is possible in principle in terms of the direction. This angular spectrum is preferably measured analogously to the acceptance angle spectrum of the outcoupling structure, wherein preferably the reference straight line, the normal or plane on the basis of which the angular spectrum is measured is displaced parallel such that measurement is carried out at the arrangement location of the light source and/or the first side surface. The angular spectrum of the electromagnetic radiation emitted by the light source in the direction of the light guide can preferably likewise be measured in relation to a chief ray direction of the electromagnetic radiation emitted by the light source in the direction of the light guide. In the case of this angular spectrum, it is preferably possible likewise to draw a distinction between angular spectrum in a vertical direction and angular spectrum in a horizontal direction, or else not to draw such a distinction. This angular spectrum is preferably the angular range in which an intensity emitted in the direction of the light guide is measurable and/or would have to be present on the basis of calculations. This angular spectrum can be determined for example in relation to a number between 0 and 1, which is called the relative intensity emitted in the direction of the light guide. In this case, this number determines whether a relative intensity emitted in the direction of the light guide is present within a specific angle or angular range measured as described above. By way of example, this relative intensity emitted in the direction of the light guide can be normalized in relation to the maximum intensity emitted in the direction of the light guide at a specific angle or angular range within the angular spectrum. The relative intensity emitted in the direction of the light guide then assumes the value 1 at the at least one angle within the angular range at which the intensity radiated in is at a maximum, and the value 0 is assumed if no measurable intensity at all is radiated in. In this case, the angular spectrum emitted in the direction of the light guide is preferably defined by the relative intensity emitted in the direction of the light guide being 0.1 or greater for the angular range comprised. Alternatively, the angular spectrum radiated in can be defined by the fact that there an intensity emitted in the direction of the light guide, taking account of possible measurement and/or calculation uncertainties (e.g. noise), is greater than 0, preferably greater than 0.1 lm.

The angular spectra mentioned in the paragraph above can be realized in particular by the choice of light source, illumination arrangement, possible use of beam shaping components, non-use of beam shaping components, etc. Such an angular spectrum can be realized in particular when the simplest possible light source is chosen without beam shaping components.

The features described above preferably enable the beam constitution of the emitted or incoupled light to be described and advantageously expressed as a ratio to the guided angular spectrum and/or the acceptance angle spectrum of the holographic outcoupling structure.

The angular spectrum of the electromagnetic radiation radiated in, primarily of the first spectrum, that is guided in the light guide from the illumination arrangement to the holographic outcoupling structure is preferably the angular spectrum of the electromagnetic radiation emitted by the light source, in particular of the first spectrum, which is radiated into the light guide and is situated within the light guide as far as the outcoupling structure. This angular spectrum is preferably measured in the same way as described above for the acceptance angle spectrum of the outcoupling structure, where it is preferably possible likewise to draw a distinction between angular spectrum in a vertical direction and angular spectrum in a horizontal direction, or indeed not to draw such a distinction. The angular spectrum of the electromagnetic radiation radiated in that is guided in the light guide from the illumination arrangement to the holographic outcoupling structure can likewise be measured in relation to a chief ray direction of the electromagnetic radiation guided in the light guide from the illumination arrangement to the holographic outcoupling structure.

The angular spectrum of the electromagnetic radiation radiated in that is guided in the light guide from the illumination arrangement to the holographic outcoupling structure and/or the acceptance angle spectrum of the holographic outcoupling structure have/has an absolute value of at most 5°.

Absolute value preferably means that the angle around the reference straight line (e.g. surface normal) or reference plane (e.g. cross-sectional plane and/or longitudinal sectional plane), independently of the respective direction in which measurement is carried out, is always designated as a positive value. This involves measuring preferably always the smallest of all possible angles which is enclosed between reference straight line and/or reference plane and light beam considered. By way of example, if directions were taken into account here in the measurement of the angle, an angle measured in one direction could be designated e.g. with +3°, wherein the same angle from a magnitude standpoint, measured in the opposite direction, is designated with −3°. This angle then preferably always has an absolute value of +3°. This definition of "absolute value" preferably also applies in other contexts in which the words absolute value are used.

The acceptance angle spectrum of the holographic outcoupling structure can preferably be realized by corresponding production, for example corresponding illumination or exposure during recording.

The angular spectrum guided in the light guide can for example by a corresponding geometry of the light guide (e.g. a tapering of the light guide from the illumination arrangement toward the outcoupling surface, in particular combined with a correspondingly shaped side surface, e.g. a stepped tapering with step sections having an orientation that is substantially perpendicular to the chief ray direction) and/or a corresponding configuration of the refractive index of the light guide (e.g. a refractive index modulation within the light guide that correspondingly deflects light beams oriented substantially non-parallel to the chief ray direction, and/or a small difference in refractive index between light guide at the outer surfaces and surroundings, such that total internal reflection is made more difficult). A gradient-index optical unit can be used, for example.

It can be preferred overall for the spectral width of the electromagnetic radiation emitted by the light source and/or the illumination arrangement and/or the acceptance frequency spectrum (see below for further explanations concerning the acceptance frequency spectrum) of the holographic outcoupling structure to be upwardly limited, since an excessively wide outcoupled frequency spectrum can disadvantageously limit the quality of the representation.

In order to limit a wide emission spectrum of the light source by way of the illumination arrangement, the illumination arrangement can have e.g. a corresponding spectral filter, e.g. a bandpass filter. Such a filter is simple and cost-effective to realize, e.g. by means of a film having filter properties between light source and first side surface of the light guide.

In this case, the spectral limitation can be 20 nm or less, preferably 10 nm or less, more highly preferably 5 nm or less, even more highly preferably 2 nm or less, and in particular 1 nm or less.

Advantageously, independently of the quality of the light source and/or the illumination arrangement, in particular in regard to the angular spectrum of the electromagnetic radiation radiated in by the illumination arrangement and/or emitted by the light source in the direction of the light guide, it is possible to achieve an at least acceptable functionality of the holographic illumination function of the holographic outcoupling structure by limiting the acceptance angle spectrum thereof and/or the angular spectrum guided thereto through the light guide. This can preferably be understood as the realization of a kind of "filter function" for the angles accepted by the outcoupling structure or for the angles guided to the outcoupling structure. As a result, for example, an inexpensive light guide can be realized with an improved holographic illumination function.

In one preferred example embodiment, the angular spectrum of the radiated-in electromagnetic radiation guided in the light guide from the illumination arrangement to the holographic outcoupling structure has a magnitude of at most 25°, preferably at most 20°. In this regard, it is possible to use a simple and inexpensive light guide which does not require complex geometries and/or configurations of the refractive index.

In a further preferred embodiment, the acceptance angle spectrum of the holographic outcoupling structure has an absolute value of at most 5°. In this regard, a "filter function" can be realized particularly effectively, and realizes a high optical quality of the holographic illumination function.

In this embodiment, it can be preferred for the angular spectrum of the radiated-in electromagnetic radiation guided in the light guide from the illumination arrangement to the holographic outcoupling structure to be significantly greater; by way of example, this angular spectrum can have an absolute value of at least 15°, more highly preferably at least 20°, even more highly preferably at least 30° and in particular at least 40°.

Preferably, the acceptance angle spectrum of the holographic outcoupling structure in this case has an absolute value of at most 4°, more highly preferably at most 3°, even more highly preferably at most 2° and in particular at most 1°. The optical quality of the holographic outcoupling structure, in particular the holographic illumination function thereof, can thus be improved further.

In one preferred embodiment, the angular spectrum of the radiated-in electromagnetic radiation guided in the light guide from the illumination arrangement to the holographic outcoupling structure has a magnitude of at most 25°, preferably at most 20°, wherein the acceptance angle spectrum of the holographic outcoupling structure has an absolute value of at most 5°. The advantages of the above embodiments can thus be combined.

In a further preferred embodiment, the holographic outcoupling structure is configured for a maximum of the acceptance angle spectrum and/or a reconstruction angle which spectrum and/or angle substantially correspond(s) to a maximum of the angular spectrum of the light radiated in by the illumination arrangement and/or of the angular spectrum of the radiated-in electromagnetic radiation guided in the light guide from the illumination arrangement to the holographic outcoupling structure.

A maximum of the acceptance angle spectrum preferably denotes the at least one angle or the at least one angular range within the acceptance angle spectrum for which the efficiency of the holographic outcoupling structure is the highest. This maximum can be referred to in particular as reconstruction angle.

The maximum of the angular spectrum of the light radiated in by the illumination arrangement preferably denotes the at least one angle or the at least one angular range within the angular spectrum of the light radiated in by the illumination arrangement for which the most light is radiated in by the illumination arrangement. "The most" preferably relates to the magnitude of the light intensity or to the magnitude of the proportion within an angle or angular range in relation to the total light radiated in within the angular spectrum.

The maximum of the angular spectrum of the light radiated in by the illumination arrangement preferably denotes the chief ray direction of the light radiated in by the illumination arrangement.

The maximum of the angular spectrum of the radiated-in electromagnetic radiation guided in the light guide from the illumination arrangement to the holographic outcoupling structure preferably denotes the at least one angle or the at least one angular range within the angular spectrum of the radiated-in electromagnetic radiation for which the most radiated-in electromagnetic radiation is guided from the illumination arrangement to the holographic outcoupling structure. "The most" preferably relates to the magnitude of the intensity of the respective electromagnetic radiation or to the magnitude of the proportion of the guided radiation within an angle or angular range in relation to the total guided radiation within the angular spectrum.

The maximum of the angular spectrum guided in the light guide from the illumination arrangement to the holographic outcoupling structure preferably denotes the chief ray direction of the light guided in the light guide from the illumination arrangement to the holographic outcoupling structure.

If the maxima are coordinated with one another as described, the efficiency of the light guide structure can advantageously be improved.

In a further preferred embodiment, more than one holographic outcoupling structure is comprised, in particular up to five holographic outcoupling structures are comprised, wherein each holographic outcoupling structure has a different acceptance angle spectrum and/or a different reconstruction angle within the angular spectrum of the electromagnetic radiation radiated in by the illumination arrangement and/or emitted by the light source in the direction of the light guide.

Preferably, the outcoupling structures have substantially identical outcoupling properties, in particular identical beam directing and/or beam shaping of the outcoupled light beams.

Preferably, the acceptance angle spectra of the comprised outcoupling structures are substantially directly adjacent and/or have a partial overlap. This means, in particular, that the outcoupling efficiency between two adjacent outcoupling structures does not become less than 0.3.

Preferably, the outcoupling structures, parallel to the main surface, are arranged one above another congruently, in particular in the direction of a surface normal as defined above.

The holographic outcoupling structures can be arranged one above another, in particular one above another in stacked fashion, in a so-called stack.

It can likewise be preferred for the outcoupling structures to be arranged next to one another in a first direction from the illumination arrangement in the direction of the outcoupling structure.

It can be preferred for the holographic outcoupling structures (whether next to one another or one above another) to be present in a single outcoupling hologram, in particular in a so-called hologram film in which they were jointly exposed. Such an outcoupling hologram is preferably also referred to as a so-called multiplex hologram.

Preferably, in this case, the acceptance angle spectrum of each individual holographic outcoupling structure has an absolute value of at most 4°, more highly preferably at most 3°, even more highly preferably at most 2° and in particular at most 1°.

By virtue of the fact that this embodiment comprises a plurality of outcoupling structures having the properties mentioned, at the same time a high optical quality, e.g. improved outcoupling properties and/or holographic illumination functions, can be achieved by virtue of the fact that the acceptance angle spectrum of each individual outcoupling hologram is small or narrow and a high outcoupling efficiency can be attained over the angular range comprised by the individual acceptance angle spectra of the single outcoupling structures a high outcoupling efficiency. Consequently, improved outcoupling properties are advantageously paired with a high outcoupling efficiency.

In a further preferred embodiment, the frequency spectrum of the light source comprises at least 2 nm, more highly preferably at least 10 nm, in particular at least 20 nm, wherein the acceptance frequency spectrum of the outcoupling structure comprises at most 20 nm, more highly preferably at most 10 nm and in particular at most 2 nm, and wherein the maxima of the frequency spectrum and of the acceptance frequency spectrum substantially match one another.

The frequency spectrum of the light source can be for example the spectral range of the emitted electromagnetic radiation which includes significant proportions of the intensity of emitted electromagnetic radiation. Significant proportions can be e.g. 30% or more, 40% or more, 50% or more, 60% or more, 70% or more, 80% or more, or 90% or more.

The acceptance frequency spectrum of the outcoupling structure is preferably described with regard to the spectral efficiency of the holographic outcoupling structure, in particular the spectral outcoupling efficiency. The latter preferably describes the outcoupling efficiency in relation to the frequency spectrum of the light beams which are incident thereon and which are in particular within the acceptance frequency spectrum of the outcoupling surface. In this case, this efficiency can preferably assume values of between 0 (e.g. no light is outcoupled) and 1 (all light is outcoupled) for different light frequencies. In this case, the acceptance frequency spectrum is preferably defined by the fact that the outcoupling efficiency is 0.1 or greater, more highly preferably 0.5 or greater, for the frequency range comprised.

The at least one maximum of the frequency spectrum preferably comprises the at least one frequency and/or the at least one frequency range which has the maximum intensity within the frequency spectrum.

The at least one maximum of the acceptance frequency spectrum preferably denotes the at least one frequency or the at least one frequency range within the acceptance frequency spectrum for which the efficiency of the holographic outcoupling structure is the highest.

The larger the frequency spectrum outcoupled by the outcoupling structure, the lower for example the quality of the holographic function generated during the outcoupling. In the case of a holographically generated image representation, for example, the different frequency ranges are thus outcoupled into different angles, and so an image that is blurred and/or multicolored at the edges may arise.

The advantageous limitation of the emitted frequency spectrum and/or of the acceptance frequency spectrum enables in particular the outcoupling and/or the quality of the holographic illumination function to be improved. At the same time it is possible to use essentially inexpensive standard components for the light guide, in particular in regard to the light source.

In a further preferred embodiment, the intensity of the illumination arrangement is substantially proportional to a basic intensity of the illumination arrangement multiplied by an inverse of the outcoupling loss, which is characterized i. by the ratio between the angular spectrum of the radiated-in electromagnetic radiation and the overlap of the angular spectrum of the radiated-in electromagnetic radiation with the angular spectrum guided in the light guide from the illumination arrangement to the holographic outcoupling structure and the acceptance angle spectrum of the holographic outcoupling structure and/or ii. by the ratio between the frequency spectrum of the light source and the overlap of the frequency spectrum of the light source and the acceptance frequency spectrum of the holographic outcoupling structure.

The intensity of the illumination arrangement preferably denotes the intensity of the electromagnetic radiation of the first spectrum emitted by the illumination arrangement. In particular, this denotes the intensity of the electromagnetic radiation of the first spectrum emitted by the light source.

Proportionally, two variables are preferred if they are always in the same ratio to one another. This ratio is preferably called the proportionality factor. This means, in particular, that the intensity of the illumination arrangement substantially corresponds to the basic intensity of the illumination arrangement multiplied by an inverse of the outcoupling loss.

The basic intensity of the illumination arrangement is preferably an intensity unit of the illumination arrangement which enables an expedient scaling on the basis of the outcoupling loss.

The basic intensity of the illumination arrangement can comprise for example the intensity of an individual standard LED which is intended to be used for the light guide. Besides the use of an LED with a higher luminous flux, the corresponding adaptation to the outcoupling loss can then be compensated for by the use of a corresponding number of standard LEDs in order to compensate for the outcoupling loss. Therefore, the basic intensity is preferably low enough to enable substantial correspondence since only a number of whole LEDs can be used and the basic intensity thus predefines the resolution of the possibility of adaptation of the intensity of the illumination arrangement to the outcoupling loss.

The basic intensity can likewise predefine the resolution of the adjustability of only one light source or else a plurality of light sources, e.g. given by the control possibilities for the intensity of the light source and/or by the light source per se.

Multiplying the basic intensity by the inverse outcoupling loss advantageously enables the latter to be compensated for, whereby a sufficient intensity of light outcoupled by the outcoupling structure is achieved even in the case of simple optical beam guiding and at the same time a small acceptance angle spectrum and/or acceptance frequency spectrum.

An overlap of the respective angular spectra and the acceptance angle spectrum preferably describes all angles which are dimensioned and/or calculated in the same way and which lie both within the stated angular spectra and within the acceptance angle spectrum. This at least one angular range preferably constitutes the overlap. By way of example, if the angular spectrum of the electromagnetic radiation radiated in is 20°, the angular spectrum guided in the light guide from the illumination arrangement to the holographic outcoupling structure is 15° and the acceptance angle spectrum is 5°, then the overlap is preferably 5°.

The ratio between the angular spectrum of the electromagnetic radiation radiated in and the overlap preferably describes the proportional ratio of the overlap with the angular spectrum radiated in and is a number smaller than 1, in particular. In the above example, this ratio would result for example from the ratio of 5° (the overlap) and 20° (the angular spectrum radiated in) and would be 5/20, i.e. ¼.

This ratio would preferably describe the outcoupling loss, where the inverse of the outcoupling loss is preferably described by the inverse of the outcoupling loss. In the above example, this inverse would be 4.

The inverse or multiplicative inverse of the outcoupling loss is preferably the reciprocal of the outcoupling loss. The inverse of the outcoupling loss is in particular the number by which the outcoupling loss has to be multiplied in order to obtain 1.

By multiplying the basic intensity by the inverse of the outcoupling loss, it is preferably possible to compensate for the latter and it is also possible to compensate for certain losses on account of a simple set-up of the light guide and/or the illumination arrangement, by simply increasing the intensity.

The overlap of the frequency spectrum of the light source and the acceptance frequency spectrum of the holographic outcoupling structure preferably denotes the at least one frequency range which is comprised both by the frequency spectrum of the light source and by the acceptance frequency spectrum.

The ratio between the frequency spectrum of the light source and the overlap of the frequency spectrum of the light source and the acceptance frequency spectrum of the holographic preferably the proportional ratio of the overlap with the frequency spectrum radiated in and is a number smaller than 1, in particular. This ratio preferably represents the spectral proportion of the frequency spectrum of the light source that is usable by the outcoupling structure.

In a further preferred embodiment, a basic intensity of the illumination arrangement comprises at least a photometric luminous flux of 5 lm. Such a value has been found to have particularly good scalability and thus suitability for the light guide structure. There are for example individual light sources, in particular individual LEDs, which emit a luminous flux of this magnitude. Consequently, besides the use of an LED with a higher luminous flux, the intensity can advantageously adapt to the outcoupling loss by way of the number of light sources. Since LEDs, in particular, are inexpensive mass-produced products, the control of the intensity of the outcoupled light beams by way of the number of LEDs used is particularly inexpensive and simpler and less expensive than control of the intensity by way of complex beam shaping and/or incoupling of the illumination arrangement.

In a further preferred embodiment, the light guide has a maximum thickness of 5 mm, preferably 3 mm, perpendicular to the planar extent. Such a light guide has proved to be particularly expedient and simple in terms of installation and/or modification for a large number of applications, e.g. for an operating element and/or a door sill strip in a door frame of a vehicle. Moreover, the optical properties of the light guide can be positively influenced by this thickness. By way of example, it is thus possible to limit a guided and/or radiated-in angular spectrum of the illumination arrangement and advantageously to increase the optical quality of the outcoupled light beams.

Optical quality here denotes in particular the measure of correspondence of light beams and/or beams of light rays having desired properties, e.g. with regard to collimation, divergence and/or sharpness of an image represented by the light beams.

In a further preferred embodiment, at least one portion of the radiated-in electromagnetic radiation of the illumination arrangement is guided without prior total internal reflection within the light guide between illumination arrangement and holographic outcoupling structure. Such a direct illumination of the holographic outcoupling structure by the illumination arrangement imposes particularly low requirements in regard to radiating into the light guide (incoupling), beam guiding within the light guide and/or refractive index matching of the light guide for a total internal reflection of the light beams in the light guide. At the same time, the angular spectrum of the light beams of the illumination arrangement that are guided in the light guide to the outcoupling structure can be limited and/or determined by simple geometric relationships.

In a further preferred embodiment, the light source is chosen from the group comprising laser and/or LED. These light sources are particularly suitable for the light guide structure, can be adapted to the holographic outcoupling structure particularly well with regard to their emission properties and at the same time are inexpensive standard components.

In a further preferred embodiment, more than one light source is comprised, wherein the plurality of light sources are present arranged next to one another along the first side surface. Next to one another along the side surface preferably means arranged next to one another in the direction along the longer extent of the side surface. A distribution of a plurality of light sources next to one another makes it possible to achieve a particularly advantageous illumination of the holographic outcoupling structure, in particular in a vertical direction. In addition, the light sources can be arrangeable next to one another in a particularly simple manner, in particular in the case of a thin light guide.

In a further preferred embodiment, the illumination arrangement comprises at least one beam shaping element which is arranged between light source and first side surface and which is chosen from the group: lens, diffuser, prism, holographic structure and/or grating. In particular, combinations of these components can be comprised. In this embodiment, desired beam properties of the light beams illuminating the outcoupling structure can be achieved particularly simply, whereby improved outcoupling can take place.

In a further preferred embodiment, the illumination arrangement does not comprise an additional beam shaping element, wherein the light source is present arranged directly at the first side surface of the light guide. A particularly simple and inexpensive light guide structure can be provided as a result. At the same time a good outcoupling can be realized in particular in conjunction with the features described here concerning the angular spectrum and the acceptance angle spectrum.

In a further preferred embodiment, light guide and illumination arrangement are present jointly in a monolithic structural part.

In this case, monolithic preferably means consisting of one piece or integral. In this case, monolithic can mean in particular manufactured from one piece (e.g. the raw material of the light guiding bodies). However, it can also mean that individual components are combined into an integral structural part, specifically in particular such that after combination simple reversal of this combination process is no longer possible and/or that the components are brought together in as compact and stable a form as possible. Monolithic can preferably mean, moreover, that there is substantially a prevailing homogeneity of the components combined into one piece in regard to at least one property, for example in regard to strength, transparency and/or refractive index.

A monolithic structural part is particularly robust, easy to install and requires little maintenance. In particular, the illumination arrangement and/or illumination arrangement and light guide require(s) no (further) (re) alignment with respect to one another.

In a further preferred embodiment, the illumination arrangement is directly connected to the first side surface of the light guide by means of an injection molding method.

An injection molding method is preferably a primary forming method, in particular in plastics processing. In this case, by means of an injection molding machine, preferably, the material used is liquefied and injected into a mold under pressure, where it undergoes transition to a solid state again as a result of cooling and/or a crosslinking reaction. In this case, the hollow space or the cavity of the mold determines shape and/or surface structure. After the mold has been opened, the finished part produced can be removed.

Preferably, the at least one component of the illumination arrangement is arranged beforehand at the light guide and/or the light guide substrate and is then fixedly connected thereto during the injection molding method, in particular to form a monolithic structural part. In this case, the components of the illumination arrangement can also be partly or completely enclosed by the injection molding material used.

An illumination arrangement connected to the light guide by means of an injection molding method advantageously produces a particularly homogeneous and stable structural part. In particular, possible hollow spaces between the at least one component of the illumination arrangement and the light guide are closed by the pressure used in the injection molding method, whereby desired refractive index matching between individual parts can be achieved. In particular, improved optical properties compared with other kinds of connection can be realized as a result.

Consequently, a person skilled in the art can differentiate an illumination arrangement connected to the light guide by means of such an injection molding method from other kinds of connection.

In a further preferred embodiment, the light guide substrate is produced by means of an injection molding method and is connected to the illumination arrangement at the first side surface of the light guide. A particularly simple and inexpensive monolithic light guide structure can thus be produced, which differs from light guide structures produced in other ways in regard to improved stability and/or homogeneity.

In a further preferred embodiment, the first side surface has a smooth surface which was preferably obtained by means of a polishing method, more highly preferably a P3 polish, and/or which preferably has a root-mean-squared roughness $R_q$ of less than 2 nm.

A smooth surface is characterized in particular by low roughness. Roughness denotes in particular the unevenness of the surface height. Roughness can be quantified for example by a mean roughness $R_a$ and/or a root-mean-squared roughness $R_q$.

The person skilled in the art knows how $R_a$ and $R_q$ are defined and how they can be measured.

The mean roughness $R_a$ indicates for example a mean distance of surface points of a described surface with respect to the so-called mean line of the surface. The mean line preferably intersects the actual surface profile within a reference section of the considered surface such that a sum of the profile deviations over the length of the reference section is distributed in a parallel plane with respect to the mean line. The mean roughness preferably corresponds to the arithmetic mean of the deviation—in terms of absolute value—of the surface from the mean line.

The root-mean-squared roughness $R_q$ (referred to as rms-roughness) is calculated for example from the mean of the squares of the deviations and preferably corresponds to the "square mean" of the deviation of the surface from the mean line.

A polishing method is preferably a method in which small amounts of material are removed from a surface with the aim of smoothing the surface.

A P3 polish preferably creates particularly smooth surfaces that are distinguishable from other polishing surfaces. By way of example, a surface treated by means of a P3 polish has a root-mean-squared roughness $R_q$ of less than 2 nanometers (nm).

Given an $R_q$ of less than 2 nanometers (nm), beams can be radiated and/or incoupled into the light guiding body particularly well, even without an additional beam shaping component of the illumination device. In particular, substantially no undesired scattering and/or diffusion processes take place at the side surface.

Primarily in conjunction with an illumination arrangement which comprises a monolithic structural part with the light guide, preferably in the case of an illumination arrangement directly connected to the first side surface of the light guide by means of an injection molding method, particularly if the illumination arrangement does not comprise additional beam shaping components, such a smooth surface makes it possible to achieve a high efficiency during radiating in and a good quality of the incoupled light beams, with at the same time a favorable and simple construction of the light guide. A particularly simple coordination between incoupled angular spectrum and acceptance angle spectrum of the outcoupling structure can then be realized.

In a further preferred embodiment, the surface of the first side surface is configured to act as a diffuser for the electromagnetic radiation guided between beam shaping element and light guide and has in particular a root-mean-squared roughness of greater than 2 nm.

The surface of the first side surface is preferably also referred to as incoupling surface.

A diffuser is preferably a surface and/or a spatial region configured for scattering incident light. In this case, it is possible to use in particular scattering on the basis of total internal reflection and/or light refraction. For this purpose, it is preferred, in particular, to use a surface with a roughness such that the refraction and/or reflection produced by the surface, in a specific direction, is substantially subject to a statistical distribution. In this case, in particular, a roughness of more than 2 nm has proved to be advantageous.

The scattering at the diffuser advantageously makes it possible to achieve a desired distribution of beam directions of different beams of rays in the light guide. It is preferably possible to achieve a relatively uniform illumination of the outcoupling surface in regard to intensity and/or angle of the illumination, in particular within the acceptance angle spectrum.

In a further preferred embodiment, the holographic outcoupling structure is configured for a holographic representation by generating a real and/or virtual image in and/or outside the light guide structure and in particular within the first main surface of the light guide structure (in-plane), wherein the holographic representation preferably substantially only represents structures which are resolvable in the case of the acceptance angle spectrum of 5° and/or are recognizable as such by an observer.

A holographic representation is, in particular, a realization of a holographic illumination function. The images generated by the holographic representation can preferably give an observer a spatial impression, primarily by virtue of the fact that phase information of the image and thus spatial depth information can also be represented by the outcoupling hologram.

The generated images can preferably comprise structures which comprise for example recognizable lines or shapes of the represented image or which enable the image to be recognized. By way of example, an arrow can be represented by the outcoupled light beams of the light guide, wherein the structures comprise the arrow and primarily the boundary lines of the arrow. Preferably only structures which are resolvable in the case of the acceptance angle spectrum of 5° are represented. In order that the arrow is recognizable, for example, the boundary lines must be clearly recognizable, in particular in relation to the represented size dimension of the arrow. If the arrow is small, for example, and the boundary lines of an order of magnitude corresponding to the order of magnitude of the arrow are blurred, the arrow can e.g. no longer be resolvable and hence not be recognizable. This can take place in particular as a result of an excessively large acceptance angle spectrum in relation to the size of the represented structures. In that case, the outcoupled light beams will typically likewise have an excessively large angular spectrum and the structures are smeared, for example. An arrow such as in the example above is advantageously intended not to be represented by the outcoupling structure. Rather, the represented images and/or structures are advantageously intended to be adapted to the acceptance angle spectrum and thus also to the outcoupled angular spectrum.

In a further preferred embodiment, a plurality of holographic outcoupling structures are comprised, wherein each holographic outcoupling structure is configured to generate an identical image. In this regard, as described, for each outcoupling structure, the acceptance angle spectrum can be kept small and the image of the respective outcoupling structure can be kept sharp as a result. Overall a larger part of the angular spectrum of the light radiated into the light guide can be used in order thus to increase the illumination efficiency. Since each outcoupling structure generates the same image, and these same images are superimposed, a brighter image can thus be generated with the illumination intensity remaining constant and the efficiency of the light guide structure can be increased.

In a further preferred embodiment, the representation only represents structures larger than 1 mm, and/or the spatial depth of the representation, preferably in the viewing direction, comprises less than 20 mm.

A spatial depth of the representation comprises in particular a structural component perceived by way of the three-dimensionally appearing representation of the outcoupling hologram in the viewing direction and/or perpendicular to the first main surface of the light guide structure. In this case, a preferred viewing direction is preferably substantially perpendicular to the first main surface of the light guide structure. In contrast to traditional images generated by light beams, holographic images can have a three-dimensional depth, e.g. in the viewing direction. However, the resolution and/or recognizability of the representation of this spatial depth are/is typically dependent on the angular spectrum and/or the frequency spectrum of the diffracted (here: outcoupled) light beams and thus in particular also on the acceptance angle spectrum and/or acceptance frequency spectrum of the hologram (here: the holographic outcoupling structure). Therefore, the limitation of the spatial depth of the representation described here can be suitable in particular for good representation of this spatial depth in the case of the acceptance angle spectrum described.

There is also an analogous situation with the size of the represented figures.

Such a representation is particularly well suited to a holographic representation using simple and inexpensive means as described herein.

In a further preferred embodiment, the light guide, in particular the substrate of the light guide, comprises a material which is an optical plastic and is chosen from the group comprising polymethyl methacrylate (PMMA), polycarbonate, cyclic olefin polymer (COP) and/or cycloolefin copolymers (COC), and/or the light guide, in particular the substrate of the light guide, comprises a material which is an optical glass and is chosen from the group comprising borosilicate glass, B270, N-BK7, N-SF2, P-SF68, P-SK57Q1, P-SK58A and/or P-BK7.

These materials are particularly well suited to a transparent light guide which has good optical properties such as high transparency, homogeneity, e.g. in regard to the refractive index, and at the same time is inexpensive and easy to produce. The materials mentioned have in some instances a high refractive index in comparison with the surroundings, e.g. in comparison with air under standard conditions.

Air under standard conditions denotes in particular air pursuant to ISO 2533, especially air at 288.15 kelvins (K) or 15° C., an air pressure of 1013.25 hectopascals (hPa), and a relative humidity of 0 or dry air. However, a person skilled in the art can also assume the usual refractive index of approximately 1 for air and calculate the critical angle accordingly.

In a further preferred embodiment, the light guide structure comprises a detection arrangement, which is present arranged at a side surface of the light guide structure, preferably a second side, and is configured for detecting electromagnetic radiation with at least one second spectrum from the light guide structure, wherein the light guide structure is configured for guiding electromagnetic radiation of the second spectrum and wherein the light guide structure comprises at least one holographic incoupling structure configured for incoupling electromagnetic radiation of the second spectrum directed at the first main surface and/or a second main surface of the light guide structure within an acceptance angle spectrum of the incoupling structure in a direction of the detection arrangement.

In this case, the light guide structure can furthermore comprise one light guide, which is preferably also referred to as first light guide, or else also a second light guide. If a second light guide is comprised and e.g. the detection arrangement is present at this second light guide, then it can be preferred e.g. for the first light guide to be configured for electromagnetic radiation of the first light guide and for the second light guide to be configured for electromagnetic radiation of the second light guide. In that case, too, it is preferably possible to state that the light guide structure is configured for guiding electromagnetic radiation both of the first spectrum and of the second spectrum.

A second side surface can comprise in particular a side surface situated opposite the first side surface.

The second spectrum can preferably correspond to the first spectrum or overlap or at least partly match the latter. However, the second spectrum can preferably likewise be a different spectrum than the first spectrum, wherein the first spectrum comprises e.g. a visible spectrum and the second spectrum comprises a near infrared spectrum, which is substantially invisible to the human eye.

The at least one holographic incoupling structure is configured for incoupling electromagnetic radiation of the second spectrum directed at the first main surface and/or a second main surface of the light guide structure within an acceptance angle spectrum of the incoupling structure in a direction of the detection arrangement. This preferably means that the incoupling structure functions in a manner analogous to the outcoupling structure, but in the "opposite" direction and for a second spectrum. In other words, the incoupling structure does not couple electromagnetic radiation out of a main surface, but rather through a main surface into the light guide, wherein the radiation is simultaneously deflected in the direction of the detection arrangement, such that the electromagnetic radiation, at least partly, can be incident on the detection arrangement and/or can be detected by the latter. In this case, the deflection and/or guiding of the electromagnetic radiation in the light guide can take place directly without further reflections, and/or by means of multiple reflections in the light guide, preferably at an angle greater than the critical angle of total internal reflection at an interface of the light guide. The acceptance angle spectrum is preferably defined as in the case of the outcoupling surface, although an angle is measured between a reference straight line or plane and a light beam which is incident on the incoupling structure from outside the light guide.

The second main surface is preferably a main surface or outer surface of the light guide structure that is situated opposite the first main surface of the light guide structure.

Preferably, the incoupling surface functions in the manner described above if the electromagnetic radiation of the second spectrum that reaches the incoupling surface from outside the light guide lies within a specific angular range in relation to the incoupling structure, in relation to a surface comprised by the incoupling structure and/or in relation to the first main surface of the light guide structure. This angle or angular range is preferably measured on the basis of a light beam in relation to a straight line or a plane, as described in this document. The surface comprised by the incoupling structure can concern in particular a surface within which structural elements of the incoupling structure are present after having been arranged, e.g. the arrangement of modulations of the refractive index within the incoupling structure. The surface along the planar extent of the incoupling structure can likewise be meant.

This angular range is preferably called an acceptance angle spectrum of the incoupling structure and comprises in particular the angular range for which the incoupling hologram has the desired properties described here for the second spectrum and/or parts of the second spectrum. In particular, the acceptance angle spectrum is defined in relation to the efficiency of the holographic incoupling structure, in particular in relation to the incoupling efficiency, which is considered depending on the angular range described above. Said incoupling efficiency is preferably defined in relation to the electromagnetic radiation of the second spectrum which is incident on the incoupling structure from outside the light guide and which is incoupled into the light guide and passes to the detection arrangement. In this case, the efficiency can preferably assume values of between 0 (e.g. no light is incoupled and passes to the detection arrangement) and 1 (all light is incoupled and passes to the detection arrangement). In this case, the acceptance angle spectrum of the incoupling structure is preferably defined by the fact that the incoupling efficiency is 0.1 or greater, more highly preferably 0.5 or greater, for the angular range comprised.

The acceptance angle spectrum of the incoupling structure is measured in particular in relation to the surface normal of the incoupling structure, the surface normal of the surface comprised by the incoupling structure, and/or the surface normal with respect to the first main surface of the light guide structure.

In this case, that can be taken to mean preferably the angular spectrum in a vertical direction, i.e. preferably the angular spectrum or the projection thereof in relation to a cross-sectional plane of the light guide, and/or the angular spectrum in a horizontal direction, i.e. preferably the angular spectrum or the projection thereof in relation to a longitudinal sectional plane of the light guide. As the case may be, preferably the angle is measured in relation to the respective plane.

It can also be preferred quite generally to measure the acceptance angle spectrum of the incoupling structure in relation to the aforementioned surface normal, without referring to one of the stated directions in the process.

By means of a light guide structure comprising a detection arrangement, it is possible to increase the functionality of the light guide, e.g. it is possible to use the light guide structure as a holographic operating component.

Preferably, the incoupling structure is spaced apart from the side surface at which the detection arrangement is present. The incoupling structure can be arranged at least partly superimposed with the outcoupling structure, for example. The incoupling structure can be present arranged at and/or along the first main surface or at and/or along the second main surface.

Preferably, the acceptance angle spectrum of the incoupling structure has an absolute value of at most 5°. What can thus be achieved is that the beam guiding of the incoupled electromagnetic radiation proceeds as desired and the incoupled radiation substantially or partly reaches the detection arrangement, such that the latter can advantageously perform detection even without (complex) beam shaping components.

In a further preferred embodiment, the acceptance angle spectrum of the holographic incoupling structure has an absolute value of at most 5°, wherein more than one holographic incoupling structure is comprised, in particular up to five holographic incoupling structures are comprised, wherein each holographic incoupling structure has a different acceptance angle spectrum and/or a different reconstruction angle.

The reconstruction angle is preferably defined, mutatis mutandis, as in the case of the holographic outcoupling structure.

Preferably, the incoupling structures, parallel to the main surface, are arranged one above another congruently, in particular in the direction of a surface normal as defined above.

In this regard, despite a small acceptance angle spectrum of an individual incoupling structure, which advantageously makes it possible to realize good beam guiding to the detection arrangement, light with different acceptance angle spectra can be incoupled and the efficiency can thus be increased.

The holographic incoupling structures can be arranged one above another, in particular one above another in stacked fashion, in a so-called stack.

It can likewise be preferred for the incoupling structures to be arranged next to one another in a first direction from the detection arrangement in the direction of the incoupling structure.

It can be preferred for the holographic incoupling structures (whether next to one another or one above another) to be present in a single incoupling hologram, in particular in a so-called hologram film in which they were jointly exposed. Such an incoupling hologram is preferably also referred to as a so-called multiplex hologram.

In a further preferred embodiment, the detection arrangement comprises a detector and at least one beam shaping element which is arranged between detector and second side surface and which is chosen from the group: lens, diffuser, prism, holographic structure and/or grating.

The detector is preferably configured to generate a signal, in particular an electromagnetic signal, depending on the incident electromagnetic radiation of the second spectrum. A detector can comprise for example a camera, a CCD camera, an infrared camera, a photodiode, an avalanche photodiode or the like.

A coupling of the incoupled electromagnetic radiation with the detector can advantageously be optimized by means of a beam shaping component.

In a further preferred embodiment, the detection arrangement comprises a detector and does not comprise an additional beam shaping element, wherein the detector is present arranged directly at the second side surface of the light guide.

In particular in combination with at least one holographic incoupling structure, the acceptance angle spectrum of which has an absolute value of at most 5°, what can be realized in a particularly simple and inexpensive manner is that a large portion of the incoupled electromagnetic radiation passes to the detection arrangement and is coupled with the detector, in particular. In particular in combination with a plurality of incoupling structures, each of which has a different acceptance angle spectrum, it is thus possible to detect electromagnetic radiation of the second spectrum with a large angular spectrum.

In a further preferred embodiment, light guide, detection arrangement and/or illumination arrangement are/is present jointly in a monolithic structural part. This yields, mutatis mutandis, the embodiments and advantages already discussed above in connection with the illumination arrangement and the light guide.

In a further preferred embodiment, the detection arrangement is directly connected to the side surface of the light guide by means of an injection molding method. This yields the embodiments and advantages already discussed above in connection with the illumination arrangement and the light guide, which also hold true, mutatis mutandis, in connection with the detection arrangement.

In a further preferred embodiment, the light guide is a flat light guide, in particular a parallelepipedal light guide. This shape is particularly simple and inexpensive to produce and at the same time suitable for a large number of applications and envisaged installation spaces.

In a further preferred embodiment, the light guide is a curved light guide. By way of example, the light guide can have a radius of curvature in a plane perpendicular to a main surface and/or side surface.

An individual adaptation to applications and/or installation spaces provided for the light guide can be achieved as a result.

In a further aspect, a production method for a light guide structure, preferably as described here is provided, comprising the following steps:
  providing a planar light guide configured for guiding electromagnetic radiation of a first spectrum,
  providing at least one illumination arrangement for radiating electromagnetic radiation with a first spectrum into the light guide, comprising at least one light source for emitting electromagnetic radiation with the first spectrum, and connecting the illumination arrangement to a first side surface of the light guide, wherein the angular spectrum of the electromagnetic radiation radiated in by the illumination arrangement and/or emitted by the light source in the direction of the light guide has an absolute value of at least 15°, preferably at least 20°, more highly preferably at least 30° and in particular at least 40°,
  arranging at least one holographic outcoupling structure at and/or in the light guide, wherein the outcoupling structure is configured for outcoupling electromagnetic radiation of the illumination arrangement guided in the light guide structure to the outcoupling structure within an acceptance angle spectrum of the outcoupling structure from a first main surface of the light guide structure,
wherein the angular spectrum of the electromagnetic radiation radiated in that is guided in the light guide from a first side surface to the holographic outcoupling structure and/or the acceptance angle spectrum of the holographic outcoupling structure have/has an absolute value of at most 5°.

It is evident to a person skilled in the art that advantages, definitions, and embodiments of the device likewise apply to the method.

In one preferred embodiment, the production method additionally comprises the following step:
  connecting the illumination arrangement, in particular the light source, to a first side surface of the light guide by means of an injection molding method.

In a further preferred embodiment, more than one holographic outcoupling structure is comprised, in particular up to five holographic outcoupling structures are comprised, wherein each holographic outcoupling structure has a different acceptance angle spectrum and/or a different reconstruction angle within the angular spectrum of the electromagnetic radiation radiated in by the illumination arrangement and/or emitted by the light source in the direction of the light guide.

In a further preferred embodiment, the intensity of the illumination arrangement is proportional to a basic intensity of the illumination arrangement multiplied by an inverse of the outcoupling loss, which is characterized i. by the ratio between the angular spectrum of the radiated-in electromagnetic radiation and the overlap of the angular spectrum of the radiated-in electromagnetic radiation with the angular spectrum guided in the light guide from the illumination arrangement to the holographic outcoupling structure and the acceptance angle spectrum of the outcoupling structure and/or ii. by the ratio between the frequency spectrum of the light source and the overlap of the frequency spectrum of the light source and the acceptance frequency spectrum of the outcoupling structure.

In a further aspect, a light guide structure, produced according to the method described here is provided.

It is evident to a person skilled in the art that advantages, definitions, and embodiments of the light guide structure in accordance with the first and second aspects and of the method likewise apply to the light guide structure in accordance with this aspect.

In a further aspect, an operating element comprising a light guide structure as described, preferably above, in this document, comprising a detection arrangement, wherein the first spectrum and the second spectrum are different, wherein the outcoupling structure is in particular a first outcoupling structure, wherein the outcoupling structure is configured for generating a holographic representation of a three-dimensional operating region with respect to the operating element, and wherein the operating region with respect to the operating element lies at least partly outside the light guide structure.

The first spectrum comprises in particular spectral ranges of visible light, and the second spectrum comprises in particular near infrared light.

Preferably, incoupling structure and detection arrangement are configured for detecting electromagnetic radiation of the second spectrum from the operating region.

In particular, the detection arrangement is configured for detecting only electromagnetic radiation of the second spectrum. If first and second spectra are different, it is thus possible in a simple manner to prevent detection of electromagnetic radiation of the first spectrum that has entered into the detection arrangement in an undesired manner. This can be realized for example by the choice of a suitable material in regard to first and second spectra and/or by the use of a corresponding spectral filter.

Likewise, the incoupling structure can in particular only be suitable for incoupling electromagnetic radiation of the first spectrum and thus reduce the risk of inadvertent detection of electromagnetic radiation of the first spectrum.

An operating element is preferably configured for operating a system or a component and comprises in particular at least one switch for an input by a user. Preferably, the input at the switch can be achieved by means of light beams reflected from a user's hand or finger, for example, which are detected by the detection unit. This applies in particular if the user makes a corresponding gesture in the operating region.

The operating region can be implemented for example by a three-dimensional holographic representation of the operating region, e.g. in the form of a button, a switch or the like. An image can be represented whose form graphically accentuates the input operable by the operating element; by way of example, a three-dimensionally appearing warning triangle hovering above the operating element can be represented for the operation of a flashing warning light by the operating element.

The region in which the hovering triangle is then recognized by a user likewise contains the operating region in the example mentioned.

The designation of the above-described outcoupling structure as first outcoupling structure is primarily due to the fact that further outcoupling structures having other properties and/or functionalities can be comprised.

It is evident to a person skilled in the art that advantages, definitions, and embodiments of the light guide structure in accordance with the first and second aspects, of the method and the operating element in accordance with another aspect described below likewise apply to the operating element in accordance with this aspect.

In a further aspect, an operating element is provided, comprising:

a planar light guide structure comprising at least one first planar light guide, a first illumination arrangement comprising at least one light source for emitting electromagnetic radiation with a first spectrum, a detection arrangement comprising a detector for detecting electromagnetic radiation with a second spectrum, wherein the first and second spectra are different, wherein the first light guide is configured for guiding electromagnetic radiation of the first and second spectra, wherein the first illumination arrangement is present arranged at a first side surface of the first light guide and is configured for incoupling the emitted electromagnetic radiation of the first spectrum into the first light guide, wherein the detection arrangement is present arranged at a side surface of the light guide structure and is configured for detecting electromagnetic radiation of the second spectrum incoupled into the light guide structure, wherein the light guide structure has at least one first holographic outcoupling structure spaced apart from the first side surface, and a holographic incoupling structure spaced apart from the side surface, wherein the first outcoupling structure is configured for outcoupling the incoupled electromagnetic radiation of the first illumination arrangement from a first main surface of the light guide structure for generating a holographic representation of a three-dimensional operating region with respect to the operating element, wherein the operating region with respect to the operating element lies at least partly outside the light guide structure, and wherein the incoupling structure is configured for incoupling electromagnetic radiation with the second spectrum from the operating region into the light guide structure in a direction of the detection arrangement.

It is evident to a person skilled in the art that advantages, definitions, and embodiments of the light guide structure according to the first and second aspects, of the method according and the operating element in accordance with another aspect described above likewise apply to the operating element in accordance with this aspect, and vice versa, namely that advantages, definitions, and embodiments of the operating element described below likewise apply to the light guide structure in accordance with the first and second aspects, to the method and to the operating element described above.

In this case, it is possible to apply the properties described for the light guide structure above in regard to the angular spectra and/or acceptance angle spectra for the illumination arrangement, the light guide, the outcoupling structure and/or the incoupling structure, or else not to apply them. If these are not brought to bear, preferably no special properties are comprised with regard to the angular spectra and acceptance angle spectra.

The operating region with respect to the operating element lies at least partly, preferably even entirely, outside the operating element. For this purpose, the first outcoupling structure is preferably configured for generating a real image which is preferably three-dimensional and lies at least partly outside the operating element and which represents the three-dimensional operating region.

Preferably, the incoupling structure configured for incoupling electromagnetic radiation with the second spectrum from the operating region into the light guide structure in a direction of the detection arrangement has at least one focal plane within the operating region. As a result, events in the operating region can be detected particularly well.

In one preferred embodiment, the detection arrangement is present arranged at the second side surface of the first light guide. In this case, outcoupling structure and incoupling structure can preferably be arranged in the first light guide one above the other in relation to a direction perpendicular to the first main surface and/or next to one another in a direction from the side surface to the incoupling structure and outcoupling structure, respectively. In this case, they are preferably configured such that the functionality of the respective other structure is substantially not adversely affected. If they are arranged one above the other, the structures can be transparent for example to the respective other spectrum of the electromagnetic radiation.

This embodiment can comprise a single light guide, for example.

As a result, an operating element can be provided which consists of a particularly small number of elements and is particularly simple to produce owing to the use of only one light guide. Furthermore, installation space for the operating element can preferably be saved as a result.

In a further preferred embodiment, the light guide structure has a second planar light guide, which is present arranged parallel to the first planar light guide at an opposite side of the first planar light guide with respect to the first main surface and is configured for light guiding of electromagnetic radiation of the second spectrum, wherein the detection arrangement is present arranged at a first side surface of the second light guide and the incoupling structure is comprised by the second light guide, and wherein the first outcoupling structure is comprised by the first light guide and is transparent to electromagnetic radiation of the second spectrum between first main surface of the light guide structure and incoupling structure.

The second light guide configured for light guiding of electromagnetic radiation of the second spectrum preferably has the properties mentioned for the first light guide, mutatis mutandis, for the second spectrum.

The second planar light guide is present arranged parallel to the first planar light guide at an opposite side of the first planar light guide with respect to the first main surface, in particular at a second main surface of said first planar light guide. In this case, the first main surface of the first light guide preferably forms the first main surface of the first light guide structure.

This preferably results in two interior main surfaces of the light guides in relation to the light guide structure, wherein that of the first light guide preferably comprises the second main surface thereof and the interior main surface of the second light guide is preferably referred to as the second main surface thereof. The exterior first main surface of the first light guide in relation to the light guide structure then preferably forms the first main surface of the light guide structure, and the preferably likewise exterior first main surface of the second light guide in relation to the light guide structure preferably forms the second main surface of the second light guide structure.

In this case, the detection arrangement is arranged at a first side surface of the second light guide and the incoupling structure is comprised by the second light guide. In this regard, in particular, the radiation of the second spectrum from the operating region can be incoupled into the second light guide and can be guided through the latter as far as the first side surface of the second light guide, where the detection arrangement is present. The first outcoupling structure comprised by the first light guide is therefore intended to be transparent to electromagnetic radiation of the second spectrum between first main surface of the light guide structure and incoupling structure in order that the radiation of the second spectrum from the operating region can pass through the outcoupling structure and reach the incoupling structure.

The first and second side surfaces of the second light guide can be defined analogously to the first and second side surfaces of the first light guide. The definition can preferably be based on a convention. In particular, side surfaces of the first and second light guides that are situated on the same side of the light guide structure can be designated identically. However, it is preferably also possible to define as desired which is the first and which is the second side surface of the second light guide, e.g. also exactly oppositely to the definition for the first light guide.

This embodiment makes it possible to provide a particularly simple and well-functioning operating element in which, using simple means and with little disruption, the representation of the operating element and the detection can be realized and spatially separated from one another.

In a further preferred embodiment, between first light guide and second light guide a region is comprised which is suitable for enabling electromagnetic radiation of the first and/or second spectrum to be guided in the first and second light guides by way of total internal reflection and preferably has a lower refractive index than the light guides.

Therefore, the region is preferably transparent to electromagnetic radiation of the second spectrum.

As an alternative to a region having a lower refractive index than the light guides, the region can preferably have reflective and/or diffractive properties for the spectrum to be guided in the respective light guide at an interface adjoining said light guide.

The region can comprise for example air under standard conditions and/or a solid substance that meets the requirements, e.g. a specific adhesive for connecting the two light guides to one another.

In a further preferred embodiment, only one light guide is comprised, wherein at a second main surface of the first light guide a region is comprised which is suitable for enabling electromagnetic radiation of the first and/or second spectrum to be guided in the first light guide by way of total internal reflection and preferably has a lower refractive index than the light guide.

This is a preferred embodiment if the light guide is connected to a carrier along the second main surface, e.g. to a center console of a dashboard in a vehicle.

In a further preferred embodiment, the operating element comprises a second illumination arrangement comprising at least one second light source for emitting electromagnetic radiation with the second spectrum, wherein the second illumination arrangement is configured for illuminating the operating region with electromagnetic radiation of the second spectrum.

While possible embodiments which do not comprise a second illumination arrangement for emitting electromagnetic radiation with the second spectrum enable detection by way of residual and/or ambient light comprising electromagnetic radiation of the second spectrum, in embodiments comprising a second illumination arrangement an active illumination of the operating region is provided in order to detect radiation reflected from an object, e.g. from a user's hand, and thus to ascertain operation, if appropriate.

In this case, the illumination arrangement is preferably correspondingly arranged, aligned and/or provided with corresponding beam shaping components in order to enable an illumination of the operating region.

This embodiment can comprise one or two light guides. If two light guides are comprised, the detection arrangement is preferably present at the first side surface of the second light guide. In this case, in particular, the incoupling structure is comprised by the second light guide.

Preferably, the first outcoupling structure is comprised by the first light guide and is transparent to electromagnetic radiation of the second spectrum between first main surface of the light guide structure and incoupling structure.

In a further preferred embodiment, the second illumination arrangement is present arranged at a second main surface of the light guide structure on the opposite side of the light guide structure with respect to the first main surface of the light guide structure, wherein the holographic incoupling structure and/or the first holographic outcoupling structure, in a direction from the second illumination arrangement to the first main surface of the light guide structure, are/is transparent to the electromagnetic radiation with the second spectrum.

In this preferred variant, the second illumination arrangement is preferably arranged "under" the light guide structure, so as to be located on the second main surface, while the operating region is arranged on the other side of the light guide structure, so as to be located on the first main surface. In this regard, preferably, as a result of the features mentioned, radiation passes through the light guide structure comprising in particular incoupling and/or first outcoupling structure from the illumination arrangement in the direction of the operating region. Any possible light reflected from the operating region preferably also radiates through at least the first outcoupling structure, wherein this light is deflected by the incoupling structure in particular in the direction of the detector.

By way of example, second illumination arrangement, operating region, incoupling structure and/or outcoupling structure can be arranged with respect to one another such that, during the illumination of the operating region, there is no need to effect illumination through the incoupling structure and the latter accordingly need not be transparent to the second spectrum (example: oblique illumination). However, provision can likewise be made of a corresponding angular selectivity for the incoupling structure, such that only electromagnetic radiation of the second spectrum from the operating region, but not radiation which comes directly from the second illumination arrangement, is diffracted by the incoupling structure. This can then advantageously be transmitted by the incoupling structure.

In a further preferred embodiment, the operating element comprises the second planar light guide, wherein the second illumination arrangement is present arranged at the second side surface of the first light guide, for incoupling electromagnetic radiation of the second spectrum into the first light guide, wherein the first light guide has a second holographic outcoupling structure configured for outcoupling the incoupled electromagnetic radiation of the second illumination arrangement from the first main surface of the light guide structure in the direction of the operating region, and wherein the second outcoupling structure is transparent to electromagnetic radiation of the second spectrum between first main surface of the light guide structure and incoupling structure.

In this case, preferably, the detection arrangement is arranged at a first side surface of the second light guide and the incoupling structure is comprised by the second light guide. Furthermore, preferably, the first outcoupling structure is comprised by the first light guide and is transparent to electromagnetic radiation of the second spectrum between first main surface of the light guide structure and incoupling structure.

In a further preferred embodiment, the operating element comprises the second planar light guide, wherein the second illumination arrangement is present arranged at the second side surface of the second light guide, for incoupling electromagnetic radiation of the second spectrum into the second light guide, wherein the second light guide has a second holographic outcoupling structure configured for outcoupling the incoupled electromagnetic radiation of the second illumination arrangement from the first main surface of the light guide structure in the direction of the operating region.

In this case, preferably, the detection arrangement is arranged at a first side surface of the second light guide and the incoupling structure is comprised by the second light guide. Furthermore, preferably, the first outcoupling structure is comprised by the first light guide and is transparent to electromagnetic radiation of the second spectrum between first main surface of the light guide structure and incoupling structure.

In this case, the second outcoupling structure preferably functions, mutatis mutandis, in the same way as the first outcoupling structure, but for the electromagnetic radiation of the second spectrum and/or of the second illumination arrangement.

In this case, the detection arrangement can preferably be present arranged at the second side surface of the first light guide, the incoupling structure then preferably being comprised by the first light guide, or at the first side surface of the second light guide, the incoupling structure there preferably being comprised by the second light guide.

If the incoupling structure is comprised by the first light guide, the incoupling and outcoupling structures are preferably configured not to adversely affect the functionality of the respective other structure. That can be realized for example by means of a transparency to the respective spectrum, a suitable acceptance angle spectrum and/or a suitable acceptance frequency spectrum of the respective structure. By way of example, the first outcoupling structure could be transparent to the electromagnetic radiation of the second spectrum, such that there is no adverse effect on the outcoupling of this radiation by the second outcoupling structure.

In a further preferred embodiment, the second light guide is substantially nontransparent to electromagnetic radiation of the first spectrum. What can thus be realized particularly advantageously is that the operating element can be integrated into the interior in an optically inconspicuous manner if the second light guide has a correspondingly suitable color. By way of example, the second light guide could appear black and thus enable an adaptation to a black interior, e.g. in a vehicle. Moreover, this can particularly effectively prevent inadvertent detection of electromagnetic radiation of the first spectrum by a detection arrangement present at the second light guide.

In a further preferred embodiment, between first light guide and second light guide a stop element, in particular a film, is comprised which is substantially nontransparent to electromagnetic radiation of the first spectrum and is transparent to electromagnetic radiation of the second spectrum. As a result, an effect similar to that in the embodiment above can be achieved, but in a particularly simple and inexpensive manner.

In a further preferred embodiment, the stop element has a lower refractive index than the light guides.

Consequently, the guiding of the respective electromagnetic radiation in the light guide can be realized in a particularly simple manner.

In a further preferred embodiment, the holographic representation of the operating region with respect to the operating element comprises a three-dimensionally appearing representation of the three-dimensional operating region by a real and/or virtual holographic image.

In particular, this involves a real image which arises outside the light guide and represents a free-floating, three-dimensional representation of the operating region. Facilitated operation with high operating convenience can be realized as a result.

However, an "in-plane" representation can likewise be involved.

If the operating element is used in an automobile, for example, safety can thus be increased since particularly intuitive operation can be performed and the operator's attention can be channeled in a targeted manner.

If the operating element is used in a public area, then hygiene can be improved, for example, because no surfaces need to be touched and transmission of germs via such a surface is thus prevented.

In a further preferred embodiment, a first spectrum lies in a first wavelength range predominantly between 380 nm and 750 nm, preferably between 440 nm and 660 nm, and/or a second spectrum lies in a second wavelength range above 750 nm, preferably between 740 nm and 3 micrometers (μm), more highly preferably between 750 nm and 1.4 μm and in particular between 800 nm and 900 nm.

The second spectrum comprises near infrared light, in particular.

It has been found that particularly good visibility and operability are afforded for the visible spectra mentioned above, and particularly good detectability and hence operational reliability are afforded for the near infrared spectra mentioned above. In addition, a large number of materials are available which are particularly well suited to both spectra mentioned. Detection in the near infrared allows in particular detection of electromagnetic light which is not visible and hence not disturbing to humans.

In a further preferred embodiment, a control device is furthermore comprised, wherein the detection arrangement and the control device are configured to recognize an event in the operating region with respect to the operating element as an operating gesture and to output a corresponding control signal when an event has been recognized as an operating gesture in the operating region.

In particular, a control device is at least one integrated circuit, for example at least one microprocessor, at least one processor or processor unit, at least one CPU, at least one computing device, and/or at least one computer. For example, a control device can comprise an application-specific integrated circuit (ASIC), a programmable logic device (PLD), or a field programmable gate array (FPGA). Moreover, this context may encompass components known to a person skilled in the art, for example at least one electronic memory, an integrated circuit, at least one digital-to-analog converter, at least one analog-to-digital converter, and/or at least one amplifier.

Detection arrangement and control device are configured to recognize an event in the operating region with respect to the operating element as an operating gesture and to output a corresponding control signal when an event has been recognized as an operating gesture in the operating region.

For this purpose, the detection arrangement should perform suitable detections of electromagnetic radiation of the second spectrum, which can be used afterward for recognizing an operating gesture. By way of example, the detection arrangement can create a temporal sequence of images from the operating region in which an operating gesture is recognizable. These images can for example be converted into electronic signals and then fed to the control device.

The control device preferably has suitable algorithms for object recognition and/or gesture recognition which make it possible to recognize e.g. an operating gesture visible in the images created by the detection arrangement. Algorithms can be used here, for example, which make use of the means of so-called artificial intelligence; by way of example, artificial neural networks and/or machine learning can be used for recognizing operating gestures.

The control signal is, in particular, an electronic control signal which can control further components having a corresponding electronic signal input.

In this regard, even complex technical components, e.g. of a vehicle, can be operated intuitively and safely by way of the operating component.

In a further preferred embodiment, recognizing the event as an operating gesture in the operating region is realized by way of an image recognition and/or a distance measurement.

For image recognition, suitable image recognition algorithms can preferably be used which function e.g. on the basis of comparative 3D models, recordings from different angles, which make use of edge recognition, in particular, or function by means of components. Such algorithms can be trained e.g. on the basis of a multiplicity of images (e.g. at least one million) by means of machine learning.

In the case of image recognition, particularly in association with the embodiment in which the incoupling structure has at least one focal plane within the operating region, simplified and improved recognition of an operating gesture can be realized. By virtue of this combination of features it is possible to realize as it were a kind of "distance measurement" by virtue of the fact that a sharp recording of an operating gesture can only be realized if the operating gesture takes place in the region of the focal plane. The image recognition can accordingly be configured to recognize only gestures that take place in the region or in the vicinity of the focal plane as operating gestures since only these produce a sharp recording. For this purpose, the image recognition can be configured to recognize the "sharpness" of a recognized image. In this regard, even by means of an individual detector it is possible to realize a kind of distance measurement which increases the certainty of the operability of the operating element and reduces the risk of incorrect operation.

A distance measurement comprises in particular an (electro-) optical distance measurement. Such an (electro-) optical distance measurement can be based for example on (optical) propagation time measurement, phase modulation, interferometry, triangulation, time-of-flight (TOF) measurement or TOF camera and/or light detection and ranging or light imaging detection and ranging (LIDAR). In this case, use can preferably be made of lasers, in particular pulsed lasers, which emit electromagnetic radiation of the second spectrum.

In a further preferred embodiment, the control device comprises an image recognition unit and the detection arrangement comprises an infrared camera.

As a result, image or gesture recognition that takes place by way of recordings in the (near) infrared range can be recognized particularly well.

An image recognition unit can comprise e.g. a processor which is particularly suitable for image recognition (e.g. particularly powerful) and/or corresponding algorithms on the control device.

In a further preferred embodiment, the first and/or second light source are/is chosen from the group comprising LED and/or laser.

These light sources are particularly suitable for use in connection with holograms and are at the same time simple, compact, in need of little maintenance and inexpensive.

BRIEF DESCRIPTION OF THE DRAWINGS

The invention will be explained below with reference to further figures and examples. The examples and figures serve for illustrating a preferred embodiment of the invention without restricting the latter.

FIG. 9 shows an operating element with one light guide and only an illumination arrangement for the first spectrum.

FIG. 10 shows an operating element with one light guide, an illumination arrangement for the first spectrum and an illumination arrangement for the second spectrum.

DETAILED DESCRIPTION

Figure 1:
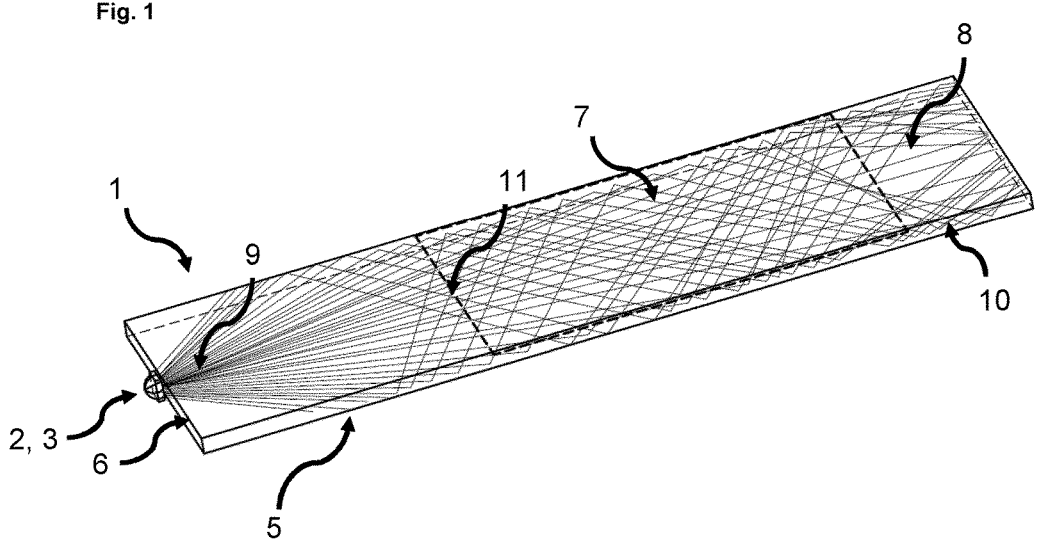
FIG. 1 shows a light guide structure with a single light guide in a perspective view.

FIG. 1 shows a light guide structure 1 comprising a planar light guide 5 in accordance with a first or second aspect of the invention in a perspective view. The planarity is accounted for primarily by the first main surface 8 of the light guide and the second main surface (at the bottom and not directly visible, indicated by dashed lines). The side surfaces perpendicular to the main surface comprise two long side surfaces, one bearing the reference sign 10, the other not being visible and merely being indicated by dashed lines. In addition, two short side surfaces are comprised; the side surface on the right in the depiction is not directly discernible owing to the perspective view and is merely indicated by dashed lines, and the side surface on the left in the illustration is the first side surface 6 of the light guide in the present example. However, this definition is purely a convention prior to the mounting of the illumination arrangement for the first spectrum 2 and is preferably defined only upon the mounting of the illumination arrangement for the first spectrum 2. In the present case, the illumination arrangement for the first spectrum 2 consists simply of a light source 3 situated on the first side surface 6 without additional beam shaping components. In the present case, the holographic outcoupling structure 7 is arranged on the first main surface 8 and is spaced apart from the first side surface 6.

Since no beam shaping component is used, the electromagnetic radiation 9 radiated into the light guide corresponds here in part simply to the electromagnetic radiation emitted by the light source in the direction of the light guide. Depending on the angle of incidence on one of the interfaces of the light guide 5 (e.g. long side surface 10), the electromagnetic radiation 9 radiated into the light guide is or is not guided. In this case, in regard to the radiation direction (the angle), the light guided in the light guide 5 substantially corresponds to the angular spectrum 11 guided from the illumination arrangement to the holographic outcoupling structure. This light can then be diffracted by the holographic outcoupling structure 7 and thus outcoupled from the first main surface 8 of the light guide 5, which surface in the present case is likewise the first main surface of the light guide structure 1.

If use is made of more than one light source 3, these can be arranged next to one another in particular along the first side surface 6. This means in particular along the first side surface along the extent thereof from the first adjoining side surface (here: long side surface 10) to the second adjoining side surface (here "rear" long side surface).

Figure 2A:
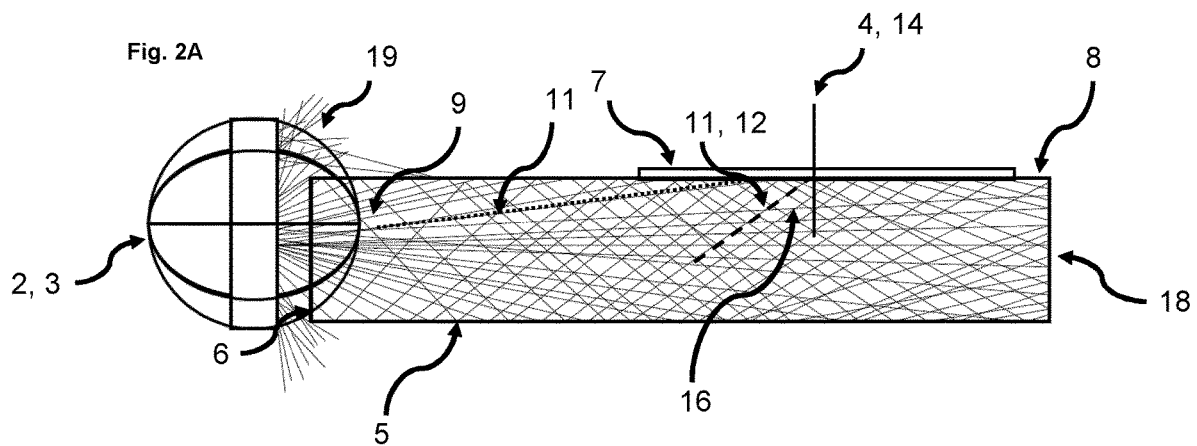
FIG. 2A shows (as a detail) the light guide structure with a single light guide in a lateral view.

FIG. 2A shows the light guide 5 in a lateral view or cross-sectional view. The light guide is somewhat shortened here in the illustration; a central section between illumination arrangement and outcoupling structure 7 is preferably not shown. The light source 3 of the illumination arrangement is depicted here in a greatly enlarged way; however, the illustration here may preferably also be true to scale. The electromagnetic radiation 19 emitted by the light source in the direction of the light guide is only partly radiated 9 into the light guide here. In turn only a portion of this radiation 9 radiated in is guided 11 through the light guide to the outcoupling structure. This guiding can follow a direct path from the illumination arrangement 3 to the outcoupling structure 7 (example: light beam with reference sign 11 highlighted by dotted line) or proceed by way of single or multiple total internal reflection within the light guide 5 (example: light beam with reference signs 11 and 12 highlighted by dashed line). It is also possible for light beams 9 radiated in not to reach the outcoupling structure because either they leave the light guide before reaching the outcoupling structure 7 or else they radiate past the latter through the light guide, without impinging on the outcoupling structure (light beams 18).

FIG. 2A furthermore includes an illustration for elucidating the (acceptance) angle spectrum. The light beam 11 which is guided in the light guide from the illumination arrangement to the outcoupling structure and which is incident 12 as a light beam on the outcoupling surface forms an angle 16 with the reference straight line 4 in the cross-sectional plane shown. The reference straight line 4 is in turn a straight line or surface normal 14 perpendicular to the surface of the holographic outcoupling structure 7. If this angle 16 lies within the (preferably horizontal) acceptance angle spectrum of the holographic outcoupling structure 7 the light beam is diffracted by the outcoupling structure 7 and outcoupled from the first main surface 8. In the case of the illustration with reference to FIG. 2A, the acceptance angle spectrum is measured directly in relation to the surface normal to the outcoupling structure 14 (here: reference straight line 4).

Figure 2B:
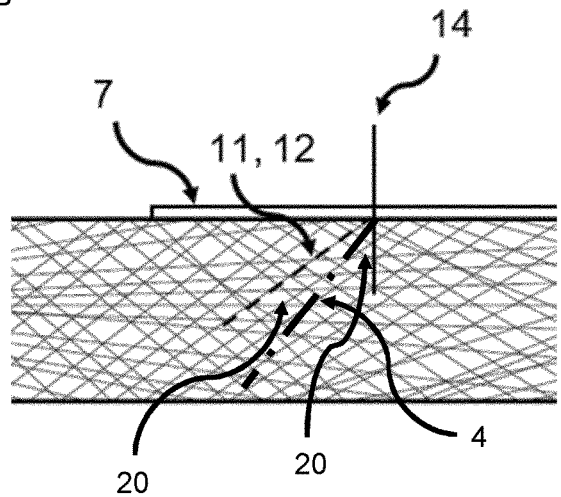
FIG. 2B shows a detail from the light guide structure shown in FIG. 2A.

FIG. 2B shows a detail from the light guide shown in FIG. 2A. Here, however, the reference straight line for the acceptance angle spectrum is not the surface normal to the outcoupling structure 14, but rather the reconstruction angle 20. If the light beam 12 incident on the outcoupling structure lies within the acceptance angle spectrum around this reconstruction angle 20, the light beam 12 is diffracted by the holographic outcoupling structure 7 and outcoupled from the light guide.

Both FIG. 2A and FIG. 2B elucidate the (acceptance) angle spectrum in a horizontal direction, that is to say (acceptance) angle spectrum in relation to a longitudinal sectional plane of the light guide or the projection thereof in relation to the longitudinal sectional plane of the light guide.

Figure 3:
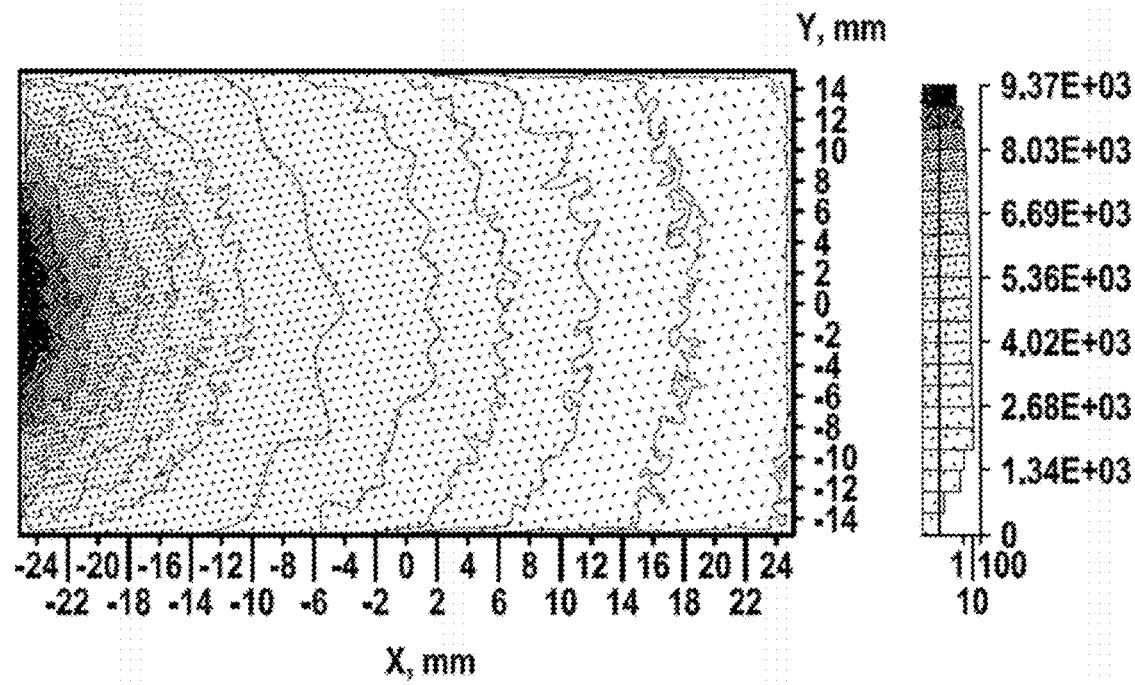
FIG. 3 shows the illuminance of the hologram surface.

FIG. 3 shows, for the light guide structure, a simulation of the spatial distribution of the illuminance of the holographic outcoupling structure in a plan view in lux (lx). The lux unit of measurement is preferably defined as the photometric illumination produced by a luminous flux of 1 lumen (lm) when evenly distributed over an area of 1 square meter.

Figure 4:
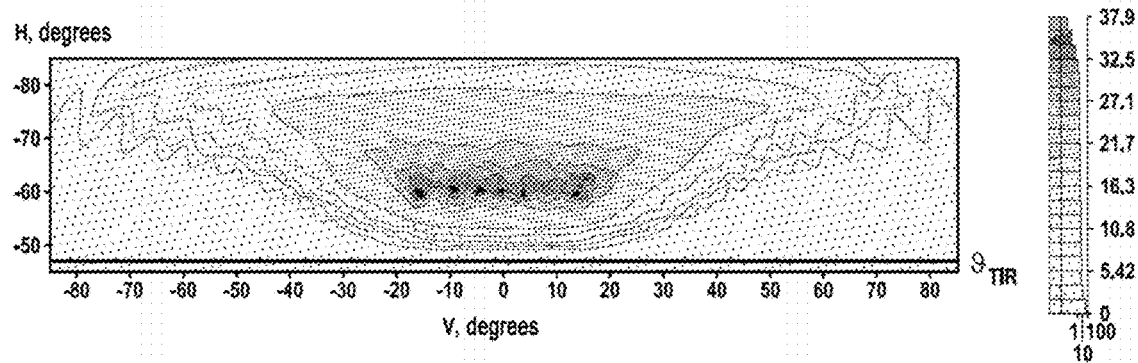
FIG. 4 shows the luminous intensity of the hologram surface.

FIG. 4 shows, for the light guide structure, a simulation of the distribution of the luminous intensity of the illuminated holographic outcoupling surface as a function of the angular spectrum of the illumination of the outcoupling surface in candela. This preferably corresponds to the angular spectrum of the electromagnetic radiation radiated in by the illumination arrangement and/or to the angular spectrum of the radiated-in electromagnetic radiation guided in the light guide from the illumination arrangement to the holographic outcoupling structure. The horizontal angular spectrum is illustrated in the vertical direction, and the vertical angular spectrum is illustrated in the horizontal direction. The luminous intensity preferably indicates the luminous flux related to the solid angle. Its SI unit is the candela (cd). Luminous flux is preferably a photometric variable which indicates the light emitted by a light source per unit time that is perceivable by the human eye. In addition to the physical (radiometric) radiant flux, it preferably takes into account the sensitivity of the human eye. It is given in the unit lumen (lm). The luminous intensity is preferably defined by $d\phi_V/d\Omega$, where $d\Omega$ preferably describes an infinitesimal solid angle element and $d\phi_V$ the luminous flux component in the solid angle element $d\Omega$. The angular spectrum (and the degree of collimation) can be determined from the representation of the luminous intensity. A centroid angle and an RMS radius are determined from these data for evaluation.

The simulation involved simulating a simple light guide structure in accordance with the first or second aspect without beam shaping components in the case of the illumination arrangement. A centroid angle of the illumination of the holographic outcoupling structure in a vertical direction of approximately 68° is found. If the reconstruction angle of the holographic outcoupling structure is chosen accordingly, for a given acceptance angle spectrum around this reconstruction angle it is possible to maximize the outcoupled quantity of light, while at the same time limiting the acceptance angle spectrum, in order to improve the quality of the holographic representation. It is also found that the angular spectrum of the illumination of the outcoupling surface in a vertical direction, in terms of absolute value, amounts to at least 15° and the centroid angle, i.e. toward both higher and lower angles around the centroid angle.

Figure 5:
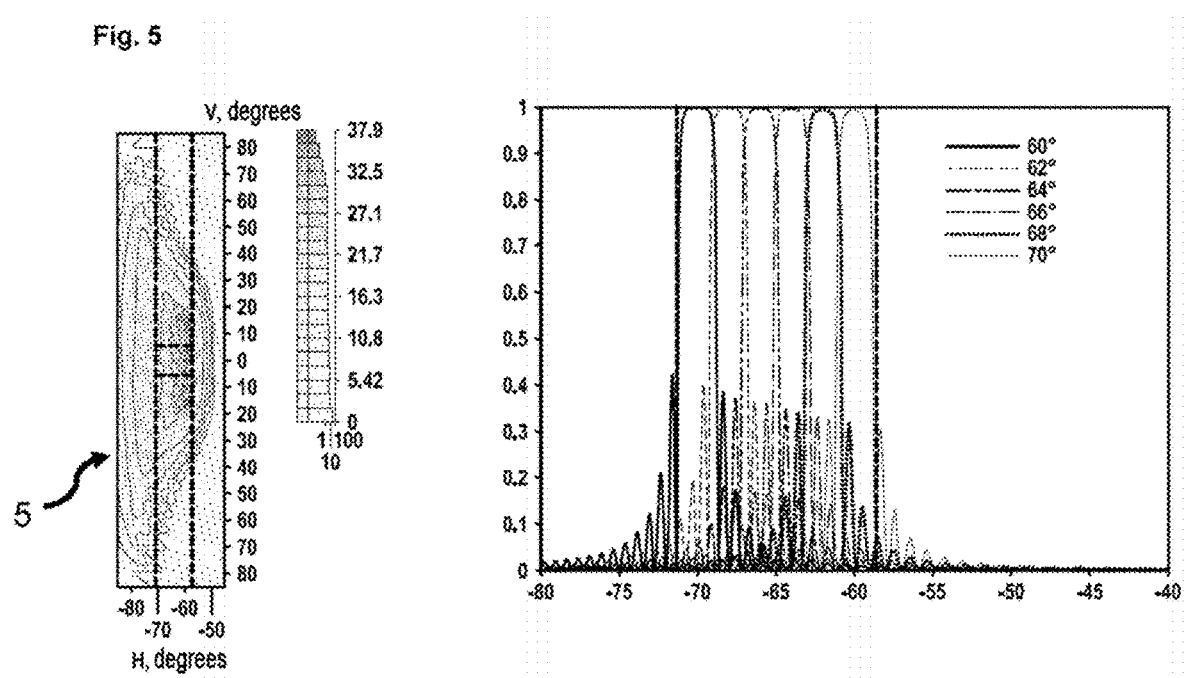
FIG. 5 shows the multiplexing of holograms for various acceptance angle spectra.

FIG. 5 shows a holographic light guide structure which is multiplexed with respect to the reconstruction angle. The left-hand depiction in FIG. 6 shows once again the distribution of the luminous intensity of the illuminated holographic outcoupling surface as a function of the angular spectrum of the illumination of the outcoupling surface. The dashed lines show the acceptance angle spectrum in a horizontal direction (vertical lines) and a vertical direction (horizontal lines).

In the example shown here the holographic outcoupling structures each have a different horizontal reconstruction angle. This is evident in the right-hand depiction in FIG. 6. This shows the outcoupling efficiencies (on a scale of 0 to 1) for six holographic outcoupling structures having, between a horizontal angle of −70° and −60°, a reconstruction angle shifted by approximately 2° in each case. The width of the outcoupling efficiency of the individual outcoupling structures distributed in each case around the reconstruction angle is preferably given by the acceptance angle spectrum (or causally by the magnitude of the refractive index modulation), which is approximately 3° in the present case. This embodiment enables overall a wider angular spectrum to be outcoupled (here e.g. from approximately −58° to approximately −72°), which arises in the light guide for example in the case of a light source applied to the side surface of the light guide directly without beam shaping components. At the same time, the small acceptance angle spectrum of each individual outcoupling structure enables a high-quality holographic illumination function to be generated. In this case, preferably all of the outcoupling structures show the same motif, e.g. an operating element.

Figure 6:
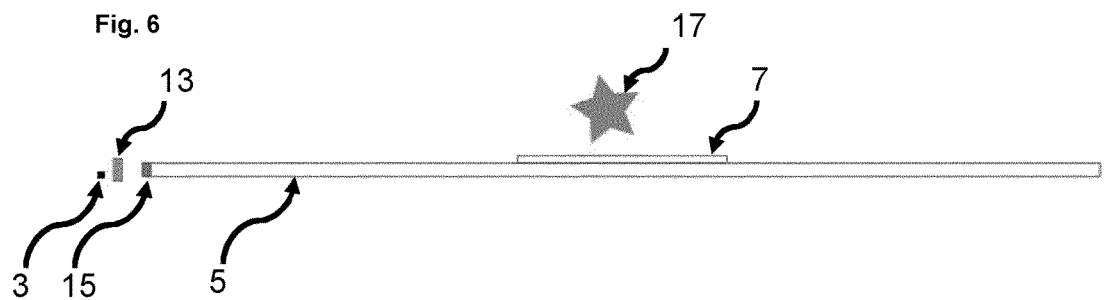
FIG. 6 shows a further side view of a light guide structure with a light guide.

FIG. 6 shows, similarly to FIG. 1, a light guide structure with a light guide 5, in which the illumination arrangement comprises light source 3 and beam shaping component 13. These are mounted directly on the first side surface of the light guide 5, which surface is also referred to as incoupling surface 15. In this case, the components of the illumination arrangement, i.e. light source 3 and beam shaping component 15, preferably have an ideally adapted and space-saving design. In the present case, these components are embodied in a flat fashion, for example, and are dimensioned appropriately with respect to the side surface/incoupling surface 15. After being joined together, the components of the illumination arrangement together with the light guide 5 can form a monolithic structural part. In this case, the beam shaping component comprises in particular a simple lens for collimation. In this case, although the light emitted by the light source 3 in the direction of the light guide will preferably have a relatively large angular spectrum of at least 15, more highly preferably at least 20°, even more highly preferably at least 30° or even at least 40°, the angular spectrum of the angular spectrum radiated in by the illumination arrangement will be significantly smaller after the collimation by the beam shaping component 15. Ensuring the quality of the holographic illumination function generated by outcoupling, here of the real image—represented symbolically by a star—of the three-dimensionally appearing operating region 17, is additionally achieved here by virtue of the small acceptance angle spectrum of the holographic outcoupling structure 7, in particular assuming that the outcoupled frequency spectrum is limited as described in this document.

Figure 7:
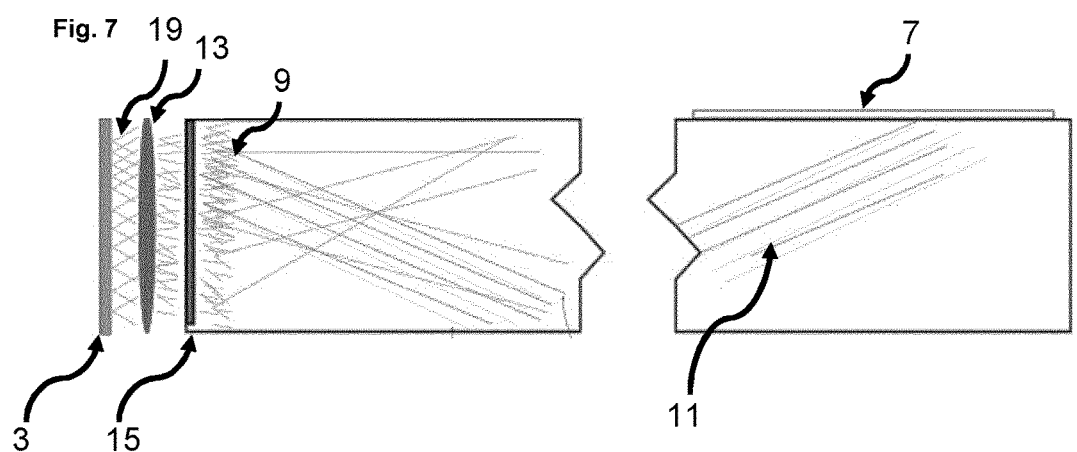
FIG. 7 shows a further enlarged side view of the light guide structure with a light guide similar to FIG. 2B.
Figure 8:
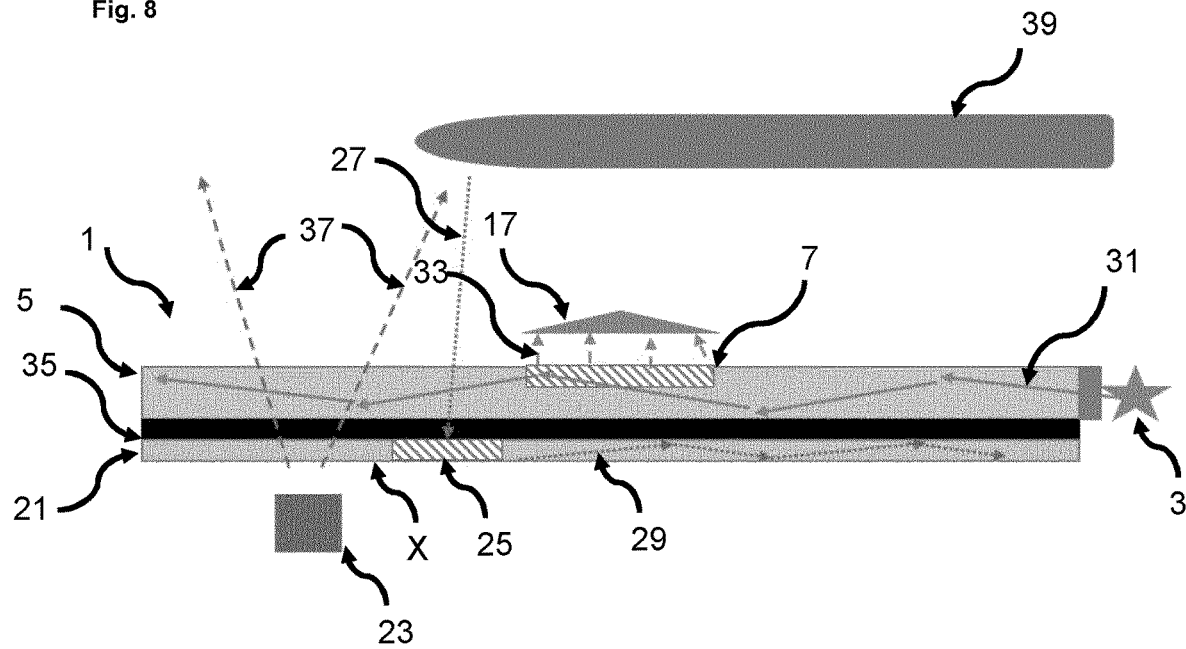
FIG. 8 shows an operating element comprising a light guide structure with two light guides.

This multistage "filtering" of the angular spectrum in order to increase the quality of the holographic illumination function is likewise evident in FIG. 8. FIG. 8 illustrates an enlarged side view of the light guide structure from FIG. 7, in which a central part of the light guide between incoupling surface 15 and holographic outcoupling structure 7 has been cut out in order to be able to show the essential parts. A first "filtering" of the large angular spectrum 19 emitted by the light source in the direction of the light guide takes place by way of the beam shaping component 13. The light 9 then radiated into the light guide by the illumination arrangement already has a significantly smaller angular spectrum. As a next possible filter stage (if necessary), only a proportion of this angular spectrum is guided 11 from the illumination arrangement to the holographic outcoupling structure 7 in the light guide 5. Finally, the acceptance angle spectrum of the holographic outcoupling structure 7 can again be significantly smaller by comparison.

FIG. 8 illustrates an operating element having a light guide structure 1 in accordance with a further aspect of the invention. A light guide structure in accordance with the first or second aspect can be employed in this case. This comprises a first light guide 5 for a first spectrum and a second light guide for a second spectrum 21, between which a stop element 35 is situated, which has a lower refractive index than the light guides 5 and 21 and which is visible through the upper light guide 5, which is preferably transparent to light, and can thus determine the visual effect of the operating element from the user's standpoint. In this case, the first light guide 5 is used for the representation of the operating region 17, which can hover above the first light guide 5 from the user's standpoint. The second light guide 21 is used for the detection of electromagnetic radiation of the second spectrum from the operating region 27. For this purpose, a light source 3 of the illumination arrangement is situated at the first side surface of the first light guide 5. This light source incouples radiation 31 into the first light guide 5. This radiation is at least partly outcoupled by the first holographic outcoupling surface 7 and thereby provides for a holographic representation of the operating region 17.

In this embodiment, a light source of an illumination arrangement for the second spectrum 23 is accommodated below the second main surface 24 of the light guide structure below the second light guide 21. The second spectrum preferably comprises near infrared light, not visible to the eye. This light preferably illuminates 37 the operating region with electromagnetic radiation of the second spectrum. If an operating gesture 39 takes place in the operating region, e.g. by way of a user's finger, a portion 27 of this light is reflected back and can be incoupled 29 by the incoupling structure 25 into the second light guide 21 in the direction of the detection arrangement.

FIGS. 9 to 14 show various possible embodiments of the operating element in accordance with an aspect of the invention.

The embodiment in accordance with FIG. 9 shows an operating element with a light guide structure comprising only the first light guide. The illumination arrangement for the first spectrum 2 in the form of a light source (not illustrated) is arranged at a first side surface of the first light guide. It incouples radiation of the first spectrum into the light guide, which is then outcoupled by the first holographic outcoupling structure 7. A three-dimensional holographic representation of an operating region 17 is generated by the outcoupled radiation. The embodiment shown does not use an illumination arrangement for electromagnetic radiation of the second spectrum. Rather, an operating gesture 39 can be detected by electromagnetic radiation of the second spectrum which comes from a finger, for example, which is supplied from ambient light, for example. The electromagnetic radiation of the second spectrum 27 coming from the operating region can then be incoupled 29 by an incoupling structure 25 into the light guide in the direction of the detection arrangement 41. The detection arrangement 41 can be an infrared camera, for example, which recognizes the finger in the operating region and thus the operating gesture 39.

Figure 11:
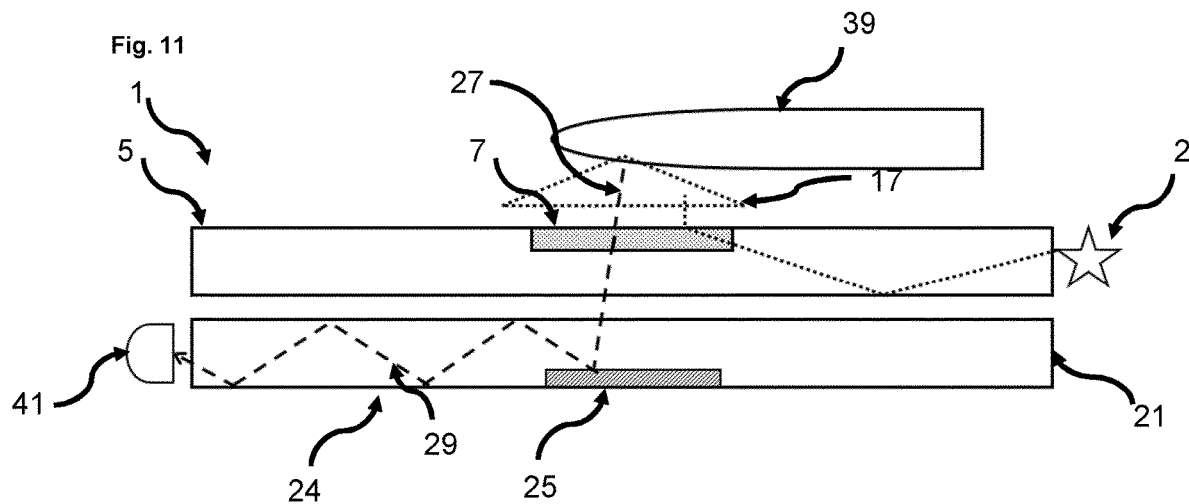
FIG. 11 shows an operating element with two light guides and only an illumination arrangement for the first spectrum.

FIG. 10 shows an embodiment which otherwise corresponds to FIG. 11 but which comprises an active illumination of the operating region 37 by an illumination arrangement for electromagnetic radiation of the second spectrum 23. In this case, the emitted beams can pass through the incoupling structure 25 e.g. by way of a corresponding adaptation of the acceptance angle spectrum of said incoupling structure 25. The first outcoupling structure 7 is likewise transparent to these illumination beams 37.

FIG. 11 shows an embodiment with two light guides 5 and 21, but only an illumination arrangement 2 for the first spectrum. The incoupling structure 25 here is situated in the second light guide 21, and incouples the electromagnetic radiation of the second spectrum from the operating region 27 into the second light guide 21. The detection arrangement 41 is situated at a first side surface of the second light guide. It is evident here that the definition of which is the first side surface and which is the second side surface can be arbitrary and the first side surface of the first light guide 5 and the first side surface of the second light guide 21 need not be present at the "same side".

Figure 12:
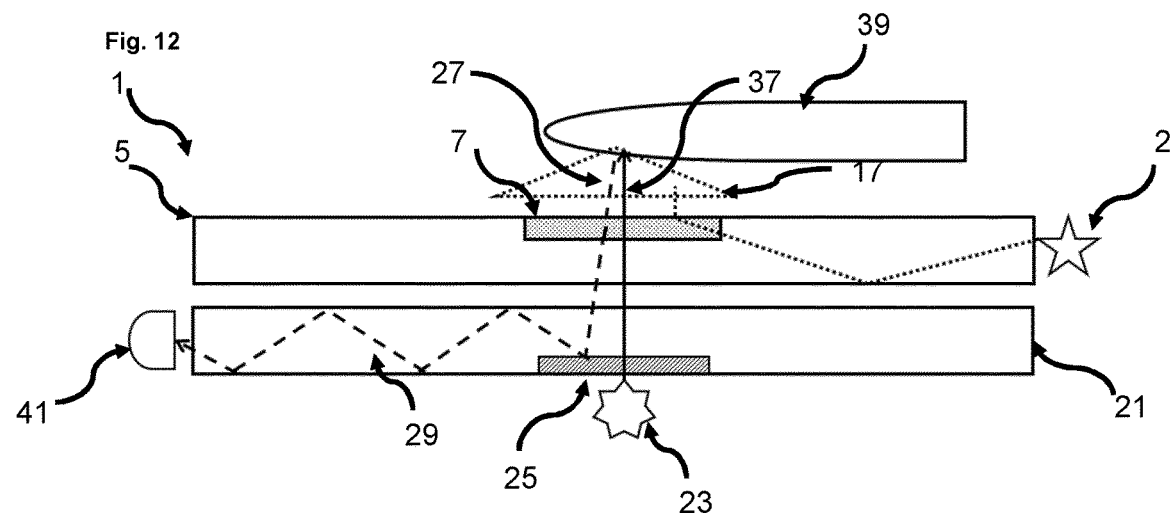
FIG. 12 shows an operating element with two light guides, an illumination arrangement for the first spectrum and an illumination arrangement of the second spectrum below the second light guide.

FIG. 12 likewise shows an embodiment with two light guides 5 and 21 and a second illumination arrangement 23 for the illumination of the operating region 37 with the second spectrum. In this case, the second illumination arrangement 23 is present arranged at a second main surface 24 of the light guide structure on the opposite side of the light guide structure 1 with respect to the first main surface 8 of the light guide structure 1 and sends radiation through both light guides 21 and 5 and also the incoupling 25 and outcoupling structures 7 arranged there. This can take place e.g. by virtue of a corresponding coordination of the acceptance angle spectra and/or the acceptance frequency spectra. This embodiment otherwise functions substantially like the embodiment in accordance with FIG. 11.

Figure 13:
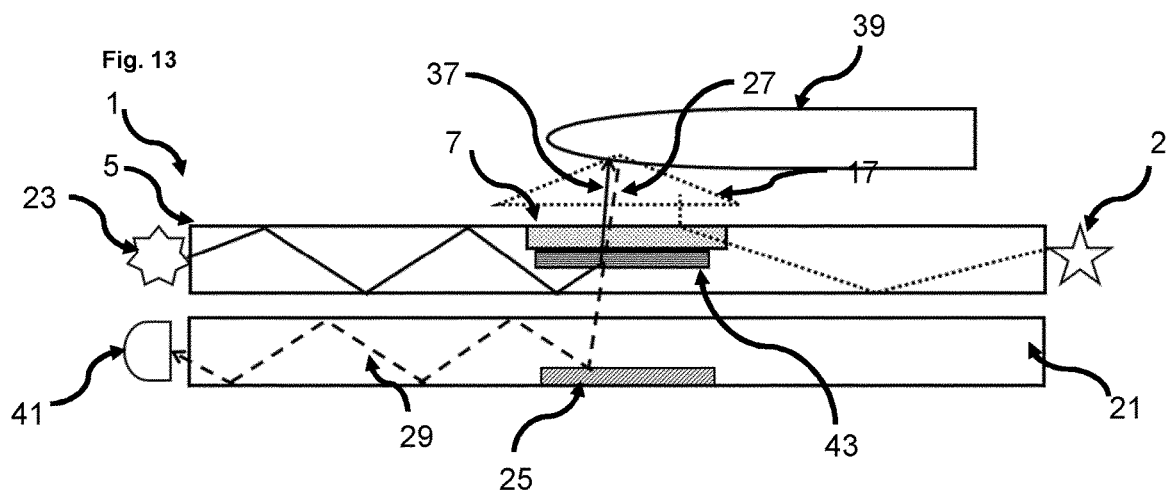
FIG. 13 shows an operating element with two light guides, an illumination arrangement for the first spectrum and an illumination arrangement of the second spectrum at the second side surface of the first light guide.

FIG. 13 shows an embodiment with two light guides 5 and 21 and a second illumination arrangement 23 for the illumination of the operating region 37 with the second spectrum. In the example shown, this illumination arrangement 23 is present arranged at the second side surface of the first light guide 5. The light of this illumination arrangement 23 is partly incoupled into the light guide 5 and outcoupled by a second outcoupling structure 43 from the first main surface of the light guide structure in the direction of the operating region. In this example, the first holographic outcoupling structure 7 has to be transparent here to the second spectrum outcoupled by the second outcoupling structure 43 situated beneath the first outcoupling structure 7, e.g. by way of adaptation of the acceptance angle spectrum and/or acceptance frequency spectrum. The arrangement could also be the other way round, of course, and so the second outcoupling structure 43 would have to be transparent to the light outcoupled by the first outcoupling structure 7. In a similar manner, in the present example, the two outcoupling structures have to be transparent to the electromagnetic radiation of the second spectrum from the operating region 27.

Figure 14:
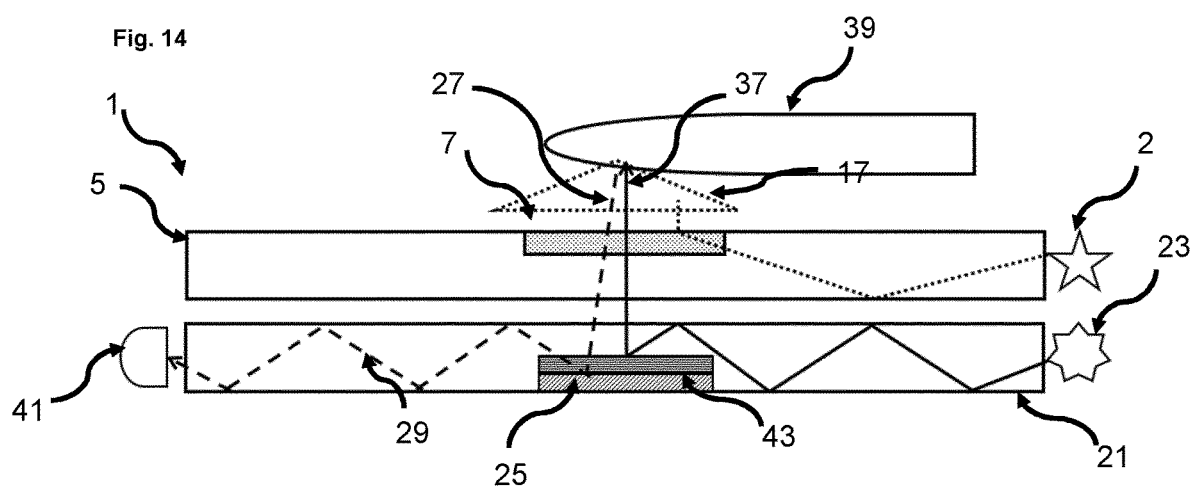
FIG. 14 shows an operating element with two light guides, an illumination arrangement for the first spectrum and an illumination arrangement of the second spectrum at the second side surface of the second light guide.

FIG. 14 shows an embodiment in which the second illumination arrangement 23 is present at the second side of the second light guide 21. Therefore, here the second outcoupling structure 43 is also arranged at/in the second light guide 23. Therefore, the first outcoupling structure 7 has to be transparent to the illumination of the operating region 37 with radiation of the second spectrum and both first 7 and second outcoupling structure 43 have to be transparent to light of the second spectrum from the operating region 27. Of course, the arrangement of the second outcoupling structure 43 above the incoupling structure 25 is by way of example and the arrangement could likewise be the other way round, with the incoupling structure 25 above the second outcoupling structure 43.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

LIST OF REFERENCE SIGNS

1 Light guide structure
2 Illumination arrangement for first spectrum
3 Light source for first spectrum
4 Reference straight line
5 (First) light guide
6 First side surface
7 (First) holographic outcoupling structure
8 First main surface of the light guide
9 Electromagnetic radiation (of the first spectrum) radiated into the light guide
10 Long side surface
11 Angular spectrum of the radiated-in electromagnetic radiation guided in the light guide to the holographic outcoupling structure
12 Light incident on the outcoupling surface
13 Beam shaping component
14 Surface normal to the outcoupling structure
15 Incoupling surface
16 Angle of the light beam incident on the outcoupling surface
17 Real image of a three-dimensional operating region
18 Electromagnetic radiation which is radiated into the light guide and does not impinge on the outcoupling structure
19 Electromagnetic radiation emitted by the light source in the direction of the light guide
20 Reconstruction angle
21 Second light guide
22 Angle between reconstruction angle and the light beam incident on the outcoupling surface
23 Illumination arrangement for second spectrum
24 Second main surface of the light guide structure
25 Holographic incoupling structure
27 Electromagnetic radiation with the second spectrum from the operating region
29 Electromagnetic radiation of the second spectrum that is incoupled into the light guide
30 structure in the direction of the detection arrangement
31 Electromagnetic radiation of the first spectrum that is incoupled into the first light guide
33 Outcoupled electromagnetic radiation of the first illumination arrangement for generating the holographic representation of the three-dimensional operating region
35 Stop element
37 Illumination of the operating region with electromagnetic radiation of the second spectrum
39 Operating gesture (finger of a user)
41 Detection arrangement
43 Second holographic outcoupling structure

The invention claimed is:

1. An operating element, comprising:
a planar light guide structure comprising at least one first planar light guide;
a first illumination arrangement comprising at least one light source for emitting electromagnetic radiation with a first spectrum; and
a detector arrangement for detecting electromagnetic radiation with a second spectrum,
wherein the first spectrum and the second spectrum are different,
wherein the first planar light guide is configured for guiding electromagnetic radiation of the first spectrum and the second spectrum,
wherein the first illumination arrangement is arranged at a first side surface of the first light guide and is configured for incoupling the emitted electromagnetic radiation of the first spectrum into the first planar light guide,
wherein the detection arrangement is arranged at a side surface of the light guide structure and is configured for detecting electromagnetic radiation of the second spectrum incoupled into the light guide structure,
wherein the light guide structure has at least one first holographic outcoupling structure spaced apart from the first side surface, and a holographic incoupling structure spaced apart from the side surface,
wherein the first holographic outcoupling structure is configured for outcoupling the incoupled electromagnetic radiation of the first illumination arrangement from a first main surface of the light guide structure for generating a holographic representation of a three-dimensional operating region with respect to the operating element,
wherein the operating region with respect to the operating element lies at least partly outside the light guide structure,
wherein the operating region incoupling structure is configured for incoupling electromagnetic radiation with the second spectrum from the operating region into the light guide structure in a direction of the detection arrangement.

2. The operating element of claim 1, wherein the detection arrangement is arranged at the second side surface of the first planar light guide.

3. The operating element of claim 1,
wherein the light guide structure has a second planar light guide, which is arranged parallel to the first planar light guide at an opposite side of the first planar light guide with respect to the first main surface and is configured for light guiding of electromagnetic radiation of the second spectrum,
wherein the detection arrangement is arranged at a first side surface of the second planar light guide and the incoupling structure is comprised by the second planar light guide,
wherein the first outcoupling structure is comprised by the first planar light guide and is transparent to electromagnetic radiation of the second spectrum between first main surface of the light guide structure and incoupling structure.

4. The operating element of claim 3, wherein between first planar light guide and second planar light guide a region is comprised which enables electromagnetic radiation of the first and/or second spectrum to be guided in the first and second planar light guides by way of total internal reflection and that has a lower refractive index than the light guides.

5. The operating element of claim 3,
wherein the second illumination arrangement is arranged at the second side surface of the first planar light guide for incoupling electromagnetic radiation of the second spectrum into the first planar light guide, and
wherein the first planar light guide has a second holographic outcoupling structure configured for outcoupling the incoupled electromagnetic radiation of the second illumination arrangement from the first main surface of the light guide structure in the direction of the operating region,
wherein the second outcoupling structure is transparent to electromagnetic radiation of the second spectrum between the first main surface of the light guide structure and incoupling structure.

6. The operating element of claim 3,
wherein the second illumination arrangement is arranged at the second side surface of the second planar light guide for incoupling electromagnetic radiation of the second spectrum into the second planar light guide,
wherein the second planar light guide has a second holographic outcoupling structure configured for outcoupling the incoupled electromagnetic radiation of the second illumination arrangement from the first main surface of the light guide structure in the direction of the operating region.

7. The operating element of claim 3, wherein the second planar light guide is substantially nontransparent to electromagnetic radiation of the first spectrum.

8. The operating element of claim 3, wherein between first planar light guide and second planar light guide a stop element comprising a film is arranged which is substantially nontransparent to electromagnetic radiation of the first spectrum and is transparent to electromagnetic radiation of the second spectrum.

9. The operating element of claim 8, wherein the stop element has a lower refractive index than the light guides.

10. The operating element of claim 1, further comprising a second illumination arrangement for emitting electromagnetic radiation with the second spectrum, wherein the second illumination arrangement is configured for illuminating the operating region with electromagnetic radiation of the second spectrum.

11. The operating element of claim 10,
wherein the second illumination arrangement is arranged at a second main surface of the light guide structure on the opposite side of the light guide structure with respect to the first main surface of the light guide structure,
wherein the incoupling structure and/or the first outcoupling structure, in a direction from the second illumination arrangement to the first main surface of the light guide structure, are/is transparent to the electromagnetic radiation with the second spectrum.

12. The operating element of claim 1, wherein the holographic representation of the operating region with respect to the operating element comprises a three-dimensionally appearing representation of the three-dimensional operating region by a real and/or virtual holographic image.

13. The operating element of claim 1, wherein a first spectrum lies in a first wavelength range of 380 nm to 750 nm.

14. The operating element of claim 13, wherein a first spectrum lies in a first wavelength range of 440 nm to 660 nm.

15. The operating element of claim 1, wherein a second spectrum lies in a second wavelength range above 750 nm.

16. The operating element of claim 1,
further comprising a control device,
wherein the detection arrangement and the control device are configured to recognize an event in the operating region with respect to the operating element as an operating gesture and to output a corresponding control signal when an event has been recognized as an operating gesture in the operating region, and
wherein recognizing the event as an operating gesture in the operating region is realized via an image recognition and/or a distance measurement.

17. The operating element of claim 1, further comprising a control device, wherein the control device comprises an image recognition unit, and wherein the detection arrangement comprises an infrared camera.

* * * * *